(12) United States Patent
Komura et al.

(10) Patent No.: US 7,283,690 B2
(45) Date of Patent: Oct. 16, 2007

(54) OPTICAL WAVEGUIDE DEVICE, METHOD OF MANUFACTURING THE SAME, AND OPTICAL COMMUNICATION EQUIPMENT

(75) Inventors: Yoshiyuki Komura, Kyotanabe (JP); Kazuyuki Hayamizu, Kyotanabe (JP); Yukari Terakawa, Kyoto (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 119 days.

(21) Appl. No.: 10/610,372

(22) Filed: Jun. 30, 2003

(65) Prior Publication Data

US 2004/0062506 A1    Apr. 1, 2004

(30) Foreign Application Priority Data

Jul. 2, 2002    (JP)    ............... 2002-194005

(51) Int. Cl.
*G02F 1/295* (2006.01)
*G02B 6/35* (2006.01)

(52) U.S. Cl. ............................................ 385/8; 385/40
(58) Field of Classification Search ................ 385/8, 385/40
See application file for complete search history.

(56) References Cited

U.S. PATENT DOCUMENTS

| | | | | |
|---|---|---|---|---|
| 6,310,700 | B1 * | 10/2001 | Betts | ............................. 359/2 |
| 6,350,064 | B2 * | 2/2002 | Mitsuda et al. | ................ 385/88 |
| 6,654,188 | B2 * | 11/2003 | Stone | ........................ 359/888 |
| 2001/0046363 | A1 | 11/2001 | Purchase | |
| 2002/0037129 | A1 | 3/2002 | Brinkman | |

FOREIGN PATENT DOCUMENTS

| | | |
|---|---|---|
| JP | 64-18121 | 1/1989 |
| JP | 4-217226 | 8/1992 |
| JP | 10-221556 | 8/1998 |
| JP | 10-300962 | 11/1998 |
| JP | 2000-241640 | 9/2000 |
| JP | 2001-242430 | 9/2001 |
| WO | WO-02/10848 A1 | 2/2002 |

OTHER PUBLICATIONS

Patent Abstracts of Japan, Publication No. 10-300962 dated Nov. 13, 1998 (2 pgs.).
Patent Abstracts of Japan, Publication No. 2001-242430 dated Sep. 7, 2001 (2 pgs.).
Patent Abstracts of Japan, Publication No. 10-300962 dated Nov. 13, 1998 (2 pgs.).
Patent Abstracts of Japan, Publication No. 64-018121 dated Jan. 20, 1989 (2 pgs.).
European Search Report dated Oct. 22, 2004; Appl. No. 03101960. 7-2205-; (3 pages).
Patent Abstracts of Japan for Publication No. 10-221556.
Patent Abstracts of Japan for Publication No. 2000-241640.

* cited by examiner

*Primary Examiner*—Sung Pak
*Assistant Examiner*—Jerry T Rahll
(74) *Attorney, Agent, or Firm*—Osha Liang LLP

(57) ABSTRACT

An optical wave guide device is manufactured by bonding an optical wave guide to an optical modulator through an upper cladding layer. The optical wave guide includes a glass substrate, a lower cladding layer and cores, and the optical modulator includes elements (heaters), which are disposed on the lower surface of a glass substrate, for modulating the light propagating in the cores, and electrodes and wire bond pads which are disposed on the front surface thereof. The elements are connected to the electrodes via through-holes. With this arrangement, there can be provided an optical waveguide device, in which cores are not degraded in manufacturing processes and elements for modulating the light propagating in the cores are unlikely to be exfoliated.

8 Claims, 24 Drawing Sheets

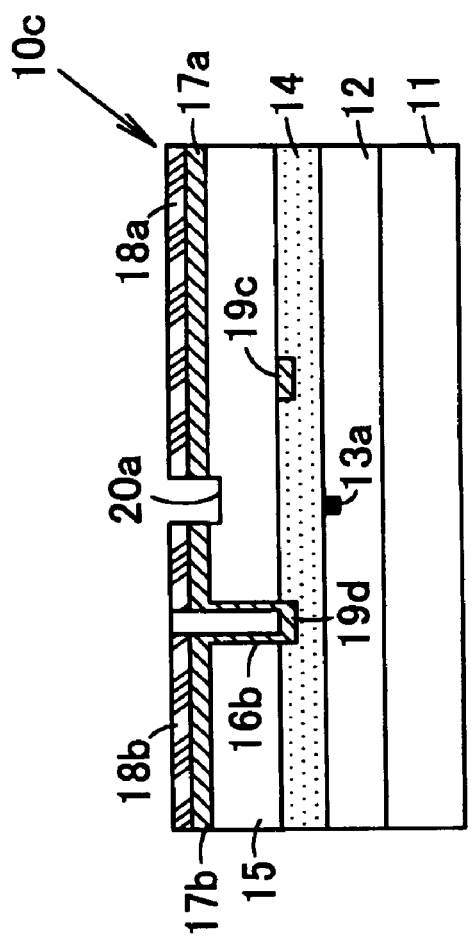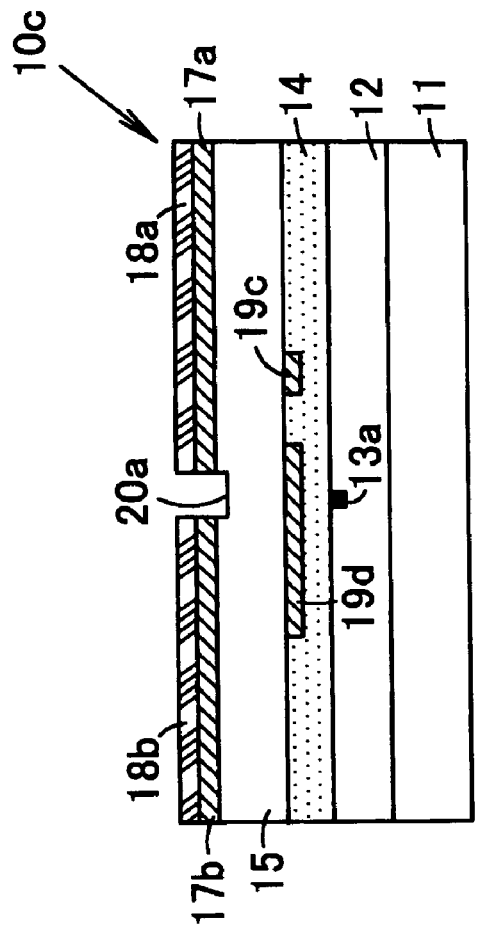
FIG. 20 (a)
FIG. 20 (b)

OPTICAL WAVEGUIDE DEVICE, METHOD OF MANUFACTURING THE SAME, AND OPTICAL COMMUNICATION EQUIPMENT

BACKGROUND OF THE INVENTION

1. Field of the Invention

The present invention relates to an optical waveguide device, a method of manufacturing the optical waveguide device, and optical communication equipment, and more particularly, to an optical waveguide device for executing modulation and switching by changing the refractive index of cores making use of a thermo-optical effect or an electro-optical effect.

2. Description of the Related Art

In optical communications capable of transmitting data in a large amount at high speed, optical fiber cables are mainly used in a transmission network. Further, an optical waveguide and an optical waveguide device, which is composed of an optical waveguide having functions of switching and modulation added thereto, are used at a point where optical fiber cables are connected to each other according to the use of the point.

FIG. 1 shows a schematic perspective view of an optical waveguide device 1 (1×8 optical switch) used conventionally. The optical waveguide device 1 shown in FIG. 1 is composed of a substrate 2, a lower cladding layer 3, cores 5a, 5b, 5c, 5d, 5e, 5f, 5g, 5h, 5i, 5j, 5k, 5l, 5m, 5n, and 5o formed in the inside of the lower cladding layer 3 an upper cladding layer 4 covering these cores 5a to 5o, heaters 8a and 8b disposed above the branch portions of the cores, and the like. The cores 5a to 5o, the lower cladding layer 3 and the upper cladding layer 4 are composed of a resin and the like having a relatively high refractive index. Further, the cores 5a to 5o is composed of a material having a refractive index higher than that of the upper and lower cladding layers 4 and The optical waveguide device 1 shown in FIG. 1 is used by connecting a core end surface 6a to an optical fiber cable, a light emitting device, and the like and by connecting core end surfaces 6b to 6i to optical fiber cables and light receiving devices. Light incident on the core end surface 6a is propagated in the inside of the core 5a, passes through branch portions at three positions, and outgoes from selected one or a plurality of the core end surfaces 6b to 6i.

In the optical waveguide device 1, it is possible to select a direction in which light travels at the branch portions of the cores. Such a scheme will be briefly explained below. FIG. 2 shows a plan view in which a part of the optical waveguide device 1 is enlarged. The light incident from the core end surface 6a is propagated in the inside of the core 5a and reaches the branch portion of the cores 5b and 5c. As shown in FIG. 3 which is an A-A sectional view of FIG. 1, the heaters 8a and 8b are disposed on the surface of the upper cladding layer 4 on the cores 5b and 5c, the core 5a is heated by heating the heater 8a, and the core 5c is heated by heating the heater 8b.

If the core 5c is heated by the heater 8b, the effective refractive index of the core 5c is reduced. Since the light, which has been propagated in the core 5a, is propagated to a core having a higher effective refractive index, if the heater 8b is heated, the light is not propagated in the core 5c and is propagated only in the core 5b. Further, if any of the the heaters 8a and 8b is not heated, the light can be propagated in both the cores 5b and 5c. As described above, since the refractive indices of the cores are varied by a temperature, the propagatrion of light in a core can be controlled by varying the refractive index of the core by turning on and off a heater just below the core.

Although the light having been propagated in the core 5b further reaches the branch portion of the cores 5d and 5e, the light can be propagated in any one of the cores 5d and 5e by heating any one of the heaters 8a and 8b. Further, if any of the the heaters 8a and 8b is heated, the light can be propagated in both the cores 5d and 5e.

Increasing employment of the optical waveguide device that has the switching function is hereinafter expected in various fields such as when data is transmitted from one data transmission source to many terminals and when maintenance and inspection are executed to an ordinarily used cable by switching it to another cable.

However, conventional optical waveguide devices have the following problems. To manufacture the optical waveguide device 1 shown in FIGS. 1 and 2, first, an optical waveguide, which is composed of the lower cladding layer 3, the cores 5a to 5o, and the upper cladding layer 4, is formed on the substrate 2, a metal thin film is vapor deposited on the upper cladding layer 4, and the heaters 8a and 8b are formed by masking the portions, to which the heaters 8a and 8b are formed by etching. Further, a pair of wire bond pads 9a and 9b for connecting the respective heaters 8a and 8b to a power supply and wiring for connecting the heaters 8a and 8b to the wire bond pads 9a and 9b are also formed on the upper cladding layer 4 by applying vapor deposition and etching.

In the method of manufacturing the optical waveguide device as described above, when the vapor deposited metal thin film is etched, there is a problem in that the upper and lower cladding layers 4 and 3 are also etched as shown in FIG. 4 or that the upper cladding layer 4 and the cores 5b and 5c are degraded by the effect of heat in the vapor deposition and a chemical agent used in the etching and thereby the performance of the optical waveguide device 1 is varied. Further, many manufacturing processes are additionally required to avoid the restriction due to the heat in the vapor deposition and the chemical agent used in the etching, from which a problem also arises in that a longer time and more expensive cost are required to manufacture the optical waveguide device.

Since the heaters 8a and 8b are formed on the surface of the upper cladding layer 4 in the conventional optical waveguide device, if a high temperature is applied to vapor deposit the heaters 8a and 8b, there is a possibility that the cores 5a and 5b are degraded, thereby a process for forming the heaters 8a and 8b are restricted. Accordingly, there is a problem that the heaters 8a and 8b are liable to be exfoliated from the upper cladding layer 4. Since the heaters 8a and 8b are only vapor deposited on the surface of the upper cladding layer 4, a problem also arises in that the heaters 8a and 8b are exfoliated by moisture and by heat generated when they are used.

Further, if the cores and the heaters are densely disposed in a small space, the wiring for connecting the heaters 8a and 8b to the wire bond pads 9a to 9d traverses over the cores 5b to 5g. If the cores are located in the vicinity of the wiring, the heat generated by the wiring and the change of an electric field and a magnetic field caused by a current flowing through the wiring apply an unexpected effect on the light propagated in the cores 5b to 5g. Accordingly, the cores must be prevented from being affected by the heat generated in the wiring and by the change of the electric field and the magnetic fields by being disposed at positions sufficiently separated from the wiring. To sufficiently and effectively heat only a particular core by a heater, the heater must be positioned near to the core by reducing the thickness of the upper cladding layer. However, it is impossible to position the heaters near to the cores as well as to separate the cores from the wiring of the heaters and electrodes in the conventional manufacturing method of the optical waveguide device in which the heaters, the wiring, and the electrodes are formed on the same surface.

SUMMARY OF THE INVENTION

An object of the present invention, which was made in view of the above problems, is to provide an optical waveguide device in which elements can be formed without adversely affecting cores and a cladding layer and in which metal thin films that constitute the elements are unlikely to be exfoliated.

Further, another object of the present invention is to provide a method of manufacturing an optical waveguide device suitable for mass production which has no possibility of degrading cores in a manufacturing process and is not restricted by heat and a chemical agent.

An optical waveguide device according to a first aspect of the invention comprises an optical waveguide joined to an optical modulator, the optical waveguide comprising cores in which light is passed and propagated and a clad surrounding the cores, and the optical modulator comprising elements affecting the light propagating in the cores.

In the optical waveguide device according to the first aspect of the invention, the optical waveguide, which has the cores and the clad, and the optical modulator, which has the elements for optically affecting the light propagating in the cores making use of a thermo-optical effect, electro-optical effect, magneto-optical effect, and the like, are manufactured separately and integrated. The elements, which affect the light propagating in the cores, are, for example, heaters, electrodes, and the like. Further, the optical effect on the light propagating in the cores is to change a transmitting direction of the light by changing the refractive index of the cores by heating them by, for example, the heaters and to modulate the light propagating in the cores by applying voltage thereto.

When the optical waveguide and the optical modulator manufactured separately are bonded to each other by a bonding agent, there is not a possibility that the cores are heated after they have been formed and a chemical agent is applied to the cores as in a case in which the elements are formed on the cores, and thus there is not a possibility that the cores are degraded. Since it is not necessary to restrict a heating temperature and the like in consideration of degradation of the cores when the elements are formed, elements which are unlikely to be exfoliated can be formed. Further, it is economical to use the bonding agent as the upper cladding layer of the cores, and manufacturing processes can be simplified thereby.

In an optical waveguide device according to a second aspect of the invention, the optical modulator according to the first aspect comprises a substrate, a first conductive layer formed on the upper surface of the substrate and a second conductive layer formed on the lower surface of the substrate, the first conductive layer may be brought into conduction with the second conductive layer, and the second conductive layer may comprise the elements.

An optical modulator of the optical waveguide device according to the second aspect of the invention is arranged as a two-layer structure formed on the front and back surfaces of the substrate. When the elements are composed of the second conductive layer and the first conductive layer is used as the electrodes for bringing the elements into conduction, the cores can be separated from the electrodes of the elements even if the core are disposed near to the elements. Therefore, it is possible to prevent the heat generated by the electrodes of the elements and the change of an electric field and a magnetic field caused thereby from affecting the light propagating in the cores as far as possible.

In an optical waveguide device according to a third aspect of the invention, through-holes may be formed through the substrate according to the second aspect from a front surface to a back surface, and the first conductive layer may be brought into conduction with the second conductive layer in the insides of the through-holes.

In the optical waveguide device according to the third aspect of the invention, the wiring of the elements is not formed on the surface on which the elements are formed and the wiring is formed in the thickness direction of the substrate. Accordingly, the heat generated in the wiring and the change of an electric field and a magnetic field caused thereby can be prevented from affecting the cores and the light propagating in the cores as far as possible.

In an optical waveguide device according to a fourth aspect of the invention, the optical waveguide device may comprise spacers disposed on the surface, on which the optical waveguide is joined to a surface of the optical modulator according to the first aspect, for keeping a distance between the cores and the elements constant.

When the distance between the cores and the elements is changed, the effect of the elements on the cores and the light propagating in the cores changes. Therefore, the distance between the cores and the elements must be made constant to avoid the variation of the performance of respective optical waveguide devices. In the optical waveguide device according to the modification of the forth aspect of the invention, since the spacers having a predetermined height (thickness) are interposed between the optical waveguide and the optical modulator, the distance between the cores and the elements can be made constant. Further, an optical waveguide device having a different modulation effect can be provided by changing the thickness of the spacers.

In a method of manufacturing an optical waveguide device according to a fifth aspect of the invention comprising an optical waveguide, which comprises cores in which light is passed and propagated and a clad surrounding the cores, and an optical modulator which comprises elements affecting the light propagating in the cores, the manufacturing method comprises the step of bonding the optical modulator on the optical waveguide or the part of the optical waveguide after the optical waveguide or a part of the optical waveguide is manufactured.

In the method of manufacturing the optical waveguide device according to the fifth aspect of the invention, since the optical waveguide or the part of the optical waveguide is bonded to the optical modulator, there is not a process in which heat and a chemical agent are used after the cores are formed, Thus, there is not a possibility that the cores are degraded. Further, since it is not necessary to take an adverse effect on the cores into consideration when the elements are formed, a heating temperature and the like need not be restricted, thereby elements, which are unlikely to be exfoliated, can be formed.

In a method of manufacturing an optical waveguide device according to a sixth aspect of the invention, the cladding layer may comprise an upper cladding layer and a lower cladding layer, and the method may comprise the steps of dropping an uncured resin onto the lower cladding layer and onto the cores after the part of the optical waveguide is manufactured by burying the cores into the lower cladding layer, bonding the optical waveguide to the optical modulator by the resin, and forming the upper cladding layer by curing the resin.

In the method of manufacturing the optical waveguide device according to the sixth aspect of the invention, since the upper cladding layer is formed by curing the resin for bonding the optical waveguide to the optical modulator, manufacturing processes can be simplified as compared with a case in which the formation of the upper cladding layer and the bonding of the optical waveguide to the optical modulator are executed in a different process. Further, the manufacturing method is economical because the optical waveguide device can be manufactured by a smaller amount of material.

A method of manufacturing an optical waveguide device according to a seventh aspect of the invention comprising an optical waveguide, which comprises cores in which light is passed and propagated and a clad surrounding the cores, and an optical modulator which comprises elements affecting the light propagating in the cores, comprising the step of forming the optical waveguide on a surface of the optical modulator after the optical modulator is manufactured.

In the method of manufacturing the optical waveguide device according to the seventh aspect of the invention, since the optical waveguide is formed on the surface of the optical modulator, there is not a process in which heat is applied and a chemical agent is used after the cores and the cladding layer is formed. Accordingly, there is not a possibility that the cores are degraded. It should be noted that when the elements are formed on the surface of the optical modulator, the elements can be disposed near to the cores by forming the optical waveguide on the surface on which the elements are formed, which permits the light propagating in the cores to be more effectively modulated.

A method of manufacturing an optical waveguide device according an eighth aspect of the invention may comprise the steps of forming the cladding layer having grooves for forming the cores in the optical waveguide by dropping an uncured resin onto the surface of the optical modulator on which the elements are formed and forming the cores by pouring a resin into the grooves and curing it.

The cladding layer having the grooves for forming the cores may be formed by pressing a stamper (mold) having inverted patterns of the cores against the resin and by curing the resin. Further, the cladding layer having the grooves for forming the cores may be molded by a duplicating method, injection molding, pouring of a resin into a mold, and the like and bonded to the optical modulator by the resin, and thereafter the cores may be formed.

A method of manufacturing an optical waveguide device according to a ninth aspect of the invention may comprises the steps of forming through-holes passing through a substrate from an upper surface to a lower surface in the optical modulator according to sixth or seventh aspect, forming first metal thin films on the upper and lower surfaces of the substrate and on the inner surfaces of the through-holes, forming second metal thin films on the first metal thin films on the substrate, and forming the elements of the first metal thin film formed on the lower surface of the substrate.

The optical modulator according to the third aspect of the invention can be manufactured by the method of manufacturing the optical waveguide device according to the ninth aspect of the invention.

A method of manufacturing an optical waveguide device according to a tenth aspect of the invention may comprise the step of forming electrodes and wire bond pads by removing a portion of the second metal thin film and a portion of the first metal thin film formed on the lower surface of the second metal thin film.

The electrodes and the wire bond pads for energizing the elements can be manufactured by the method of manufacturing the optical waveguide device according to the tenth aspect of the invention. In the methods of manufacturing the optical waveguide device according to the fifth to tenth aspects of the invention, respective optical waveguide devices can be manufactured by forming a plurality of the optical waveguide devices and a plurality of the optical modulators by using mother substrates each having a large area and finally cutting off the mother substrates with a dicing blade. Thus, these methods are suitable for mass production.

Optical communication equipment according to an eleventh aspect of the invention comprises an optical waveguide device manufactured by the manufacturing method according to the first and fifth aspects of the invention. The optical waveguide device is used by optically connecting the end surfaces of cores to light emitting devices and light receiving devices.

It should be noted that the components described above of the present invention can be combined with each other as far as possible.

BRIEF DESCRIPTION OF THE DRAWINGS

FIGS. 20A and 20B show sectional views of the optical waveguide device taken along the lines D-D' and E-E' of FIG. 19.

DESCRIPTION OF THE PREFERRED EMBODIMENTS

First Embodiment

Figure 5:
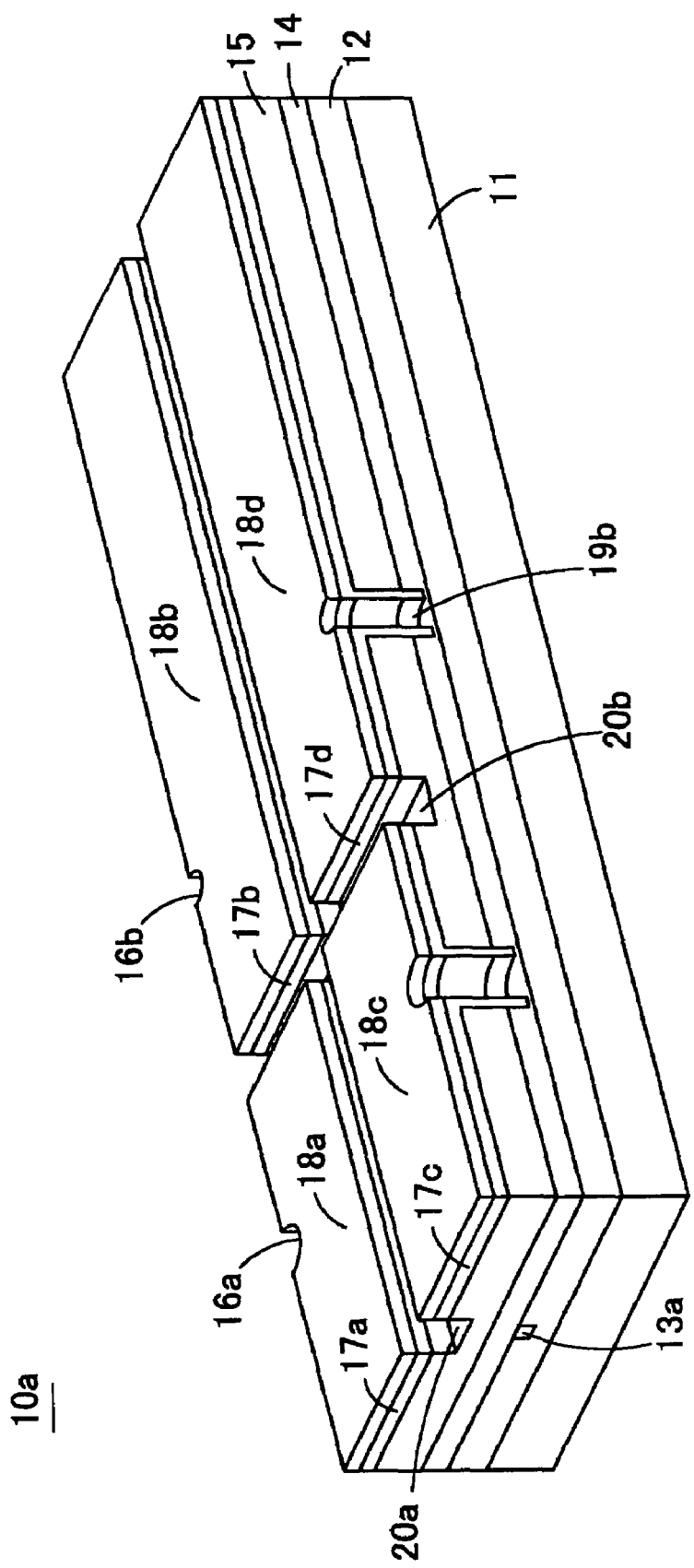
FIG. 5 shows a schematic perspective view of an optical waveguide device according to an embodiment of the present invention.
Figure 6:
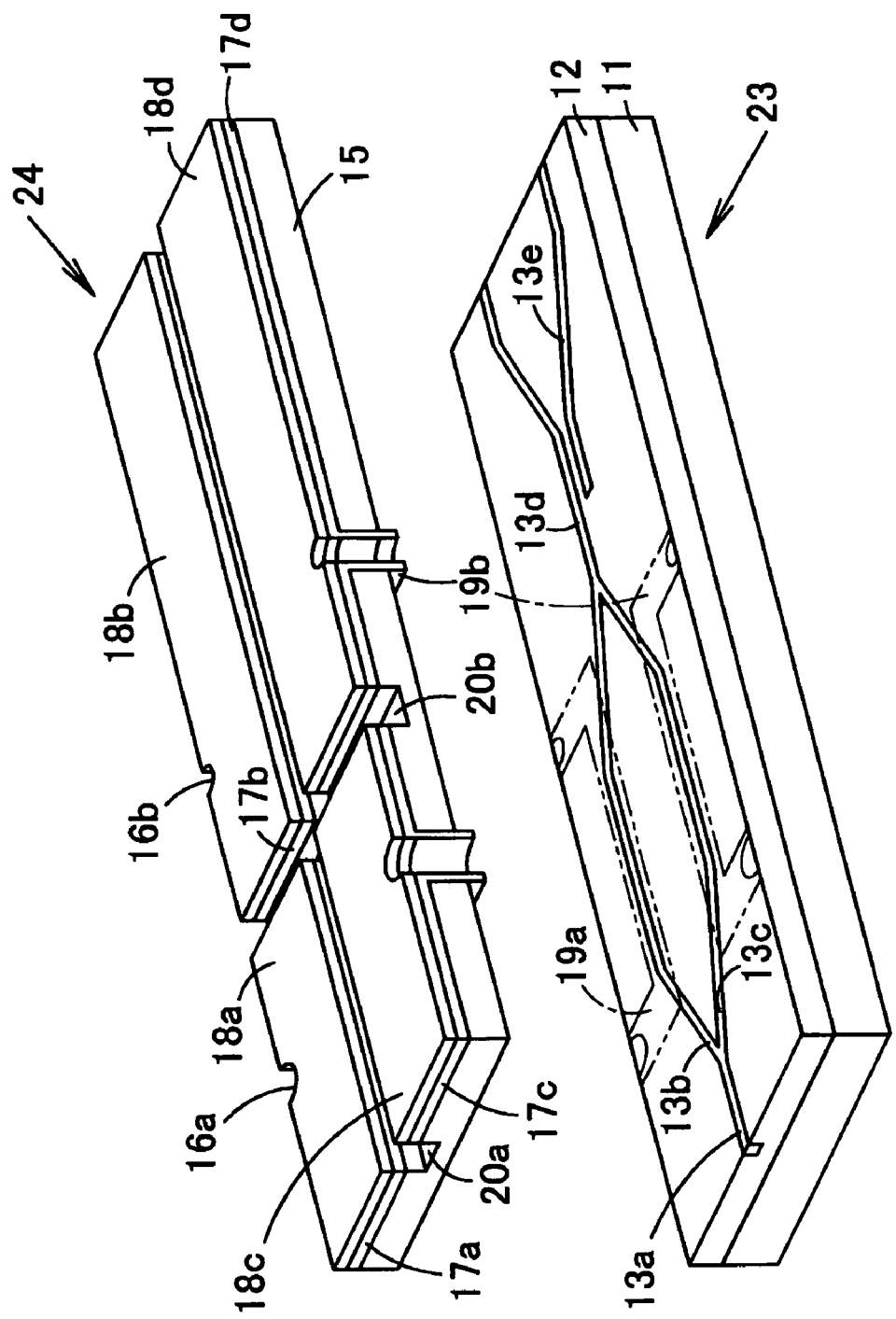
FIG. 6 shows a schematic exploded perspective view of the optical waveguide device shown in FIG. 5.

FIG. 5 shows a schematic perspective view of an optical waveguide device 10a (optical attenuator) according to an embodiment of the present invention. Further, FIG. 6 shows a schematic exploded perspective view of the optical waveguide device 10a from which an upper cladding layer 14 is removed. The optical waveguide device 10a of the present invention is composed of an optical waveguide 23, which includes a substrate 11, a lower cladding layer 12, and cores 13a to 13e formed in the inside of the lower cladding layer 12, and an optical modulator 24 having a function for modulating light propagating in the cores 13b and 13c. The optical modulator 24 is composed of a glass sheet 15, electrodes 17a, 17b, 17c, and 17d, wire bond pads 18a, 18b, 18c, and 18d, and elements (heaters) 19a and 19b formed on the lower surface of the glass sheet 15. The optical waveguide 23 is bonded to the optical modulator 24 through the upper cladding layer 14. The wire bond pads 18a, 18b, 18c, and 18d are connected to an external power supply.

Figure 7:
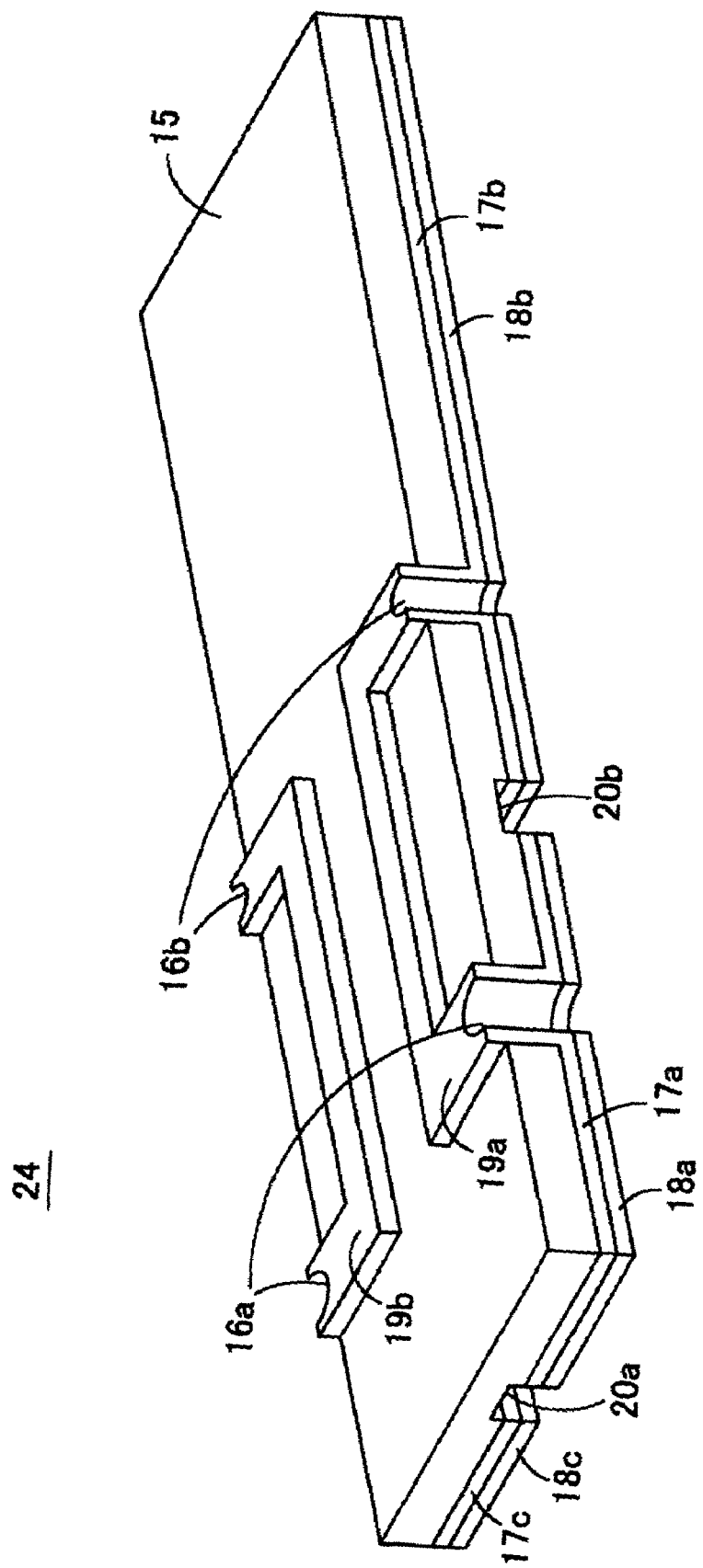
FIG. 7 shows a schematic perspective view of an optical modulator.
Figure 8:
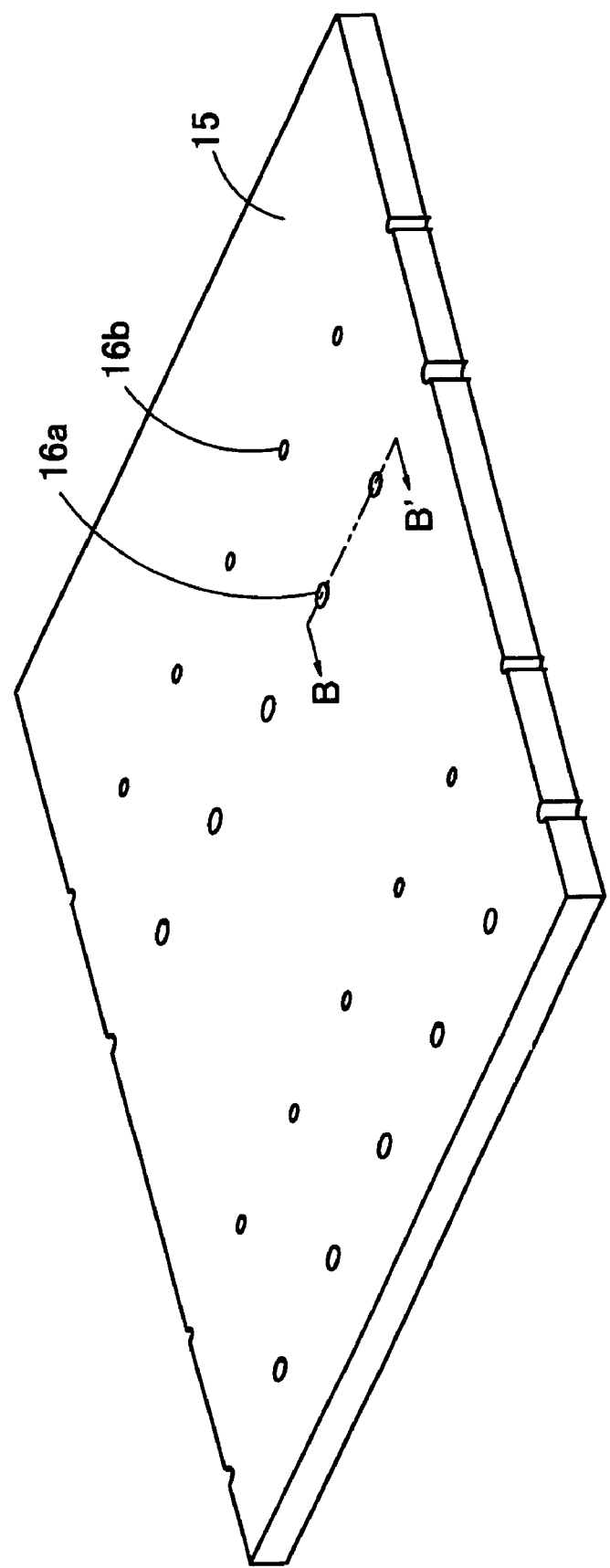
FIG. 8 shows a view explaining a manufacturing process of the optical waveguide device of the present invention.

The cores 13a to 13d of the optical waveguide device 10a of this embodiment are arranged such that the single core 13a at an entrance of a light incident is branched to the two cores 13b and 13c in midstream, and further the two cores 13b and 13c are merged into the single core 13d. The elements 19a and 19b are disposed on a surface of the upper cladding layer 14 on the cores 13b and 13c, and the element 19a can heat the core 13b and the element 19b can heat the core 13c as shown by chain double-dashed lines in FIG. 6. FIG. 7 shows a schematic perspective view of the optical modulator 24 shown in FIG. 6 when it is viwed from the back-side.

If any one of the cores 13b and 13c is heated by energizing any one of the elements 19a and 19b, the refractive index of the energized core 13b or 13c is reduced and the optical path lengths of the light passing through the inside of the core 13b or 13c are changed, thereby the phase of the light, which has passed through the core 13b, is changed from the phase of the light that has passed through the core 13c. Thus, the lights each having a different phase interfere with each other at the merging portion of the two branched cores, thereby the power of the light outgoing from the core 13e is changed according to a phase difference. Accordingly, it is possible to control the amount of attenuation of the outgoing light by changing the heat value of the element 19a or 19b by controlling the value of a current applied to the element 19a or 19b. In particular, a monitoring light receiving device is disposed in confrontation with the monitoring core 13d and the amounts of currents applied to the elements 19a and 19b are fed back while monitoring the amount of received light by the light receiving device. As a result, automatic power control can be executed so that the power of the light output to the core 13e is made constant.

The core 13e formed adjacent to the core 13d is a core disposed to cause the light transmitted in the core 13d to outgo. At the portion where the core 13d is disposed nearest to the core 13e, the cores 13d and 13e are formed in parallel with each other at an interval of about several times a wavelength. The power of the light transmitted in the core 13d can be moved to the core 13e in case that they are disposed close to each other in the degree described above. Further, the ratio of the light to be moved can be adjusted by setting the parallel portions of the cores to a proper length. In the optical waveguide device of this embodiment, about 95% of the light outgoing from the merging portion of the branched cores is moved to the core 13e and the remaining 5% of the light is caused to outgo from the light outgoing end of the core 13d. Since the core 13e is connected to an optical fiber or a light receiving device, it is impossible to directly examine the light outgoing from the core 13e. However, it is possible to indirectly observe the intensity of the light outgoing from the core 13e by monitoring the light outgoing from the core 13d.

Next, a method of manufacturing the optical waveguide device of the present invention will be explained using FIGS. 8 to 13. First, as a method of manufacturing the optical modulator 24, through-holes 16a and 16b are formed so as to pass through the glass sheet 15 from a front surface to a back surface as shown in a perspective view shown FIG. 8 and a sectional view of FIG. 9A taken along the line B-B' of FIG. 8. Since the element 19a and 19b and the electrodes 17a to electrodes 17d, which will be formed later, are brought into conduction in the insides of the through-holes 16a and 16b, the diameter of the through-hole 16a is set larger than that of the through-holes 16b so that corresponding electrodes can be easily identified. The intervals between the through-holes 16a and 16b are designed according to the lengths of the respective elements, and the interval between adjacent through-holes 16a (adjacent through-holes 16b) is designed according to the interval between adjacent cores.

Figure 9A:
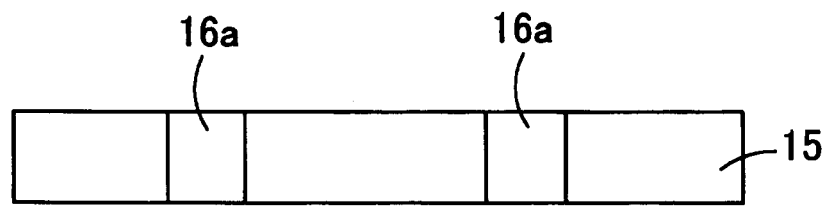
FIGS. 9A to 9D show views continued from FIG. 8 and show sectional views corresponding to the B-B' section of FIG. 8.
Figure 9B:
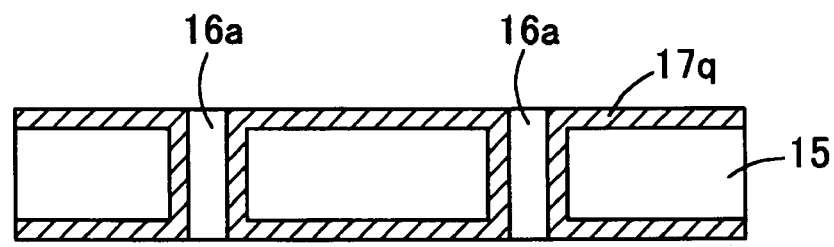
Figure 9C:
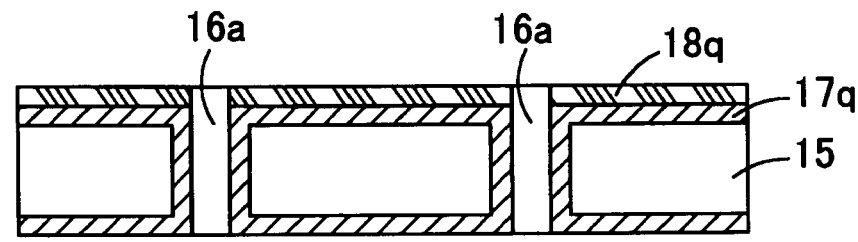
Figure 9D:
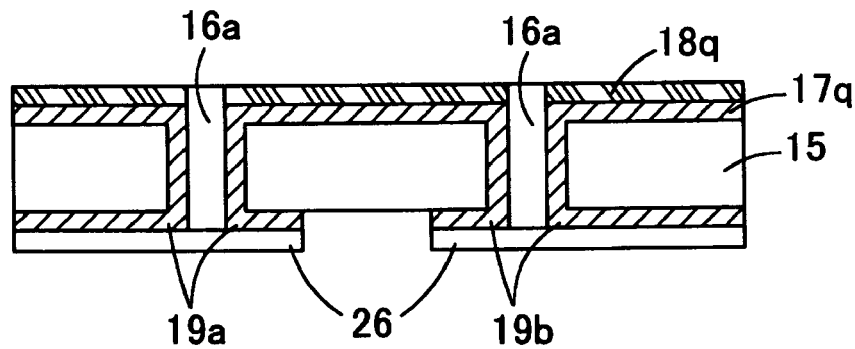

Next, as shown in FIG. 9B, conductive films 17q are formed on the upper and lower surfaces of the glass sheet 15 and on the inner surfaces of the through-holes 16a (and the through-holes 16b) by vapor depositing or sputtering titanium (Ti), which has a good intimate contact property with the glass sheet 15 and a high electric resistance. Next, as shown in FIG. 9C, wire bond pad portion 18q is formed by vapor depositing aluminum (Al) on the surface of the conductive film 17q on the upper surface of the glass sheet 15. Next, as shown in FIG. 9D, parts of the conductive film 17q on the back surface of the glass sheet 15 are covered with masks 26, and the portions of conductive film 17q which are not covered with the masks 26, are removed by etching, thereby the elements 19a and 19b are formed.

Thereafter, the optical modulator 24 may be completed by forming the electrodes 17a to 17d from the conductive film 17q on the glass sheet 15 and by forming the wire bond pads 18a to 18d from the wire bond pad portion 18q. However, the electrodes 17a to 17d and the wire bond pads 18a to 18d are formed in subsequent processes to simplify manufacturing processes. In the following description, what is formed in the above processes will be called the optical modulator 24.

Figure 10A:
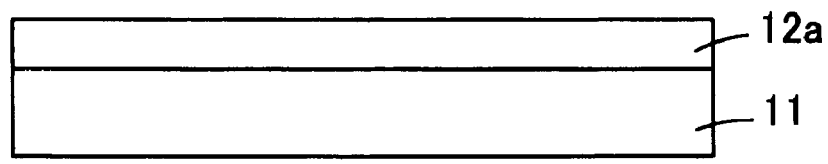
FIGS. 10A to 10D show views continued from FIGS. 9A to 9D.
Figure 10B:
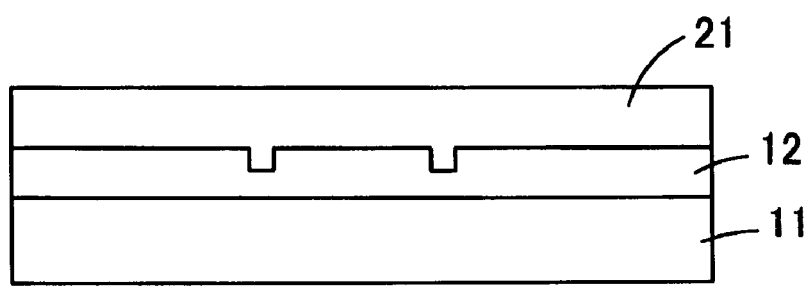
Figure 10C:
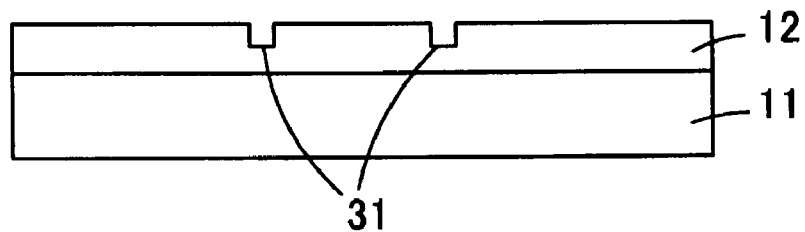
Figure 10D:
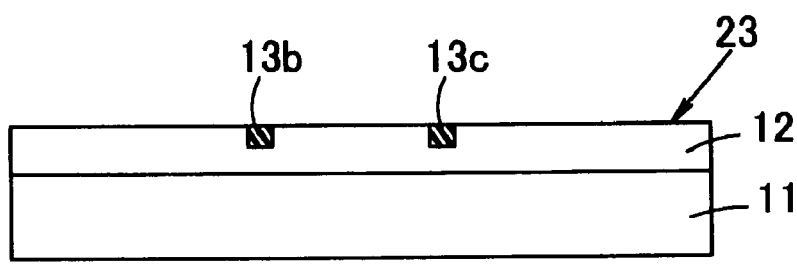
Figure 11:
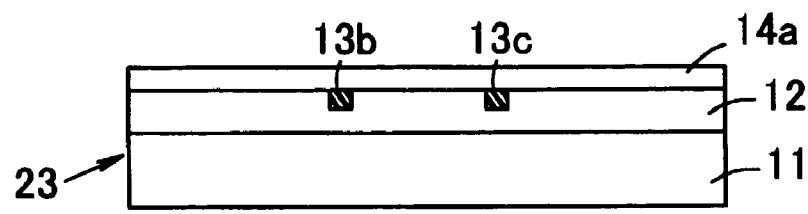
FIGS. 11A to 11C show views continued from FIGS. 10A to 10D.
Figure 11:
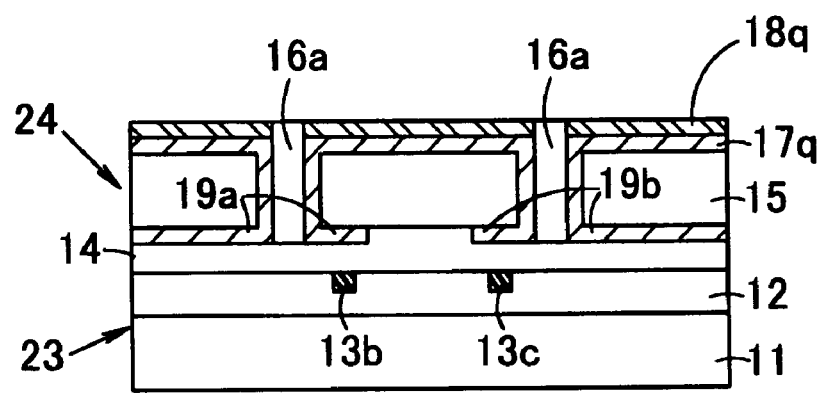
Figure 11:
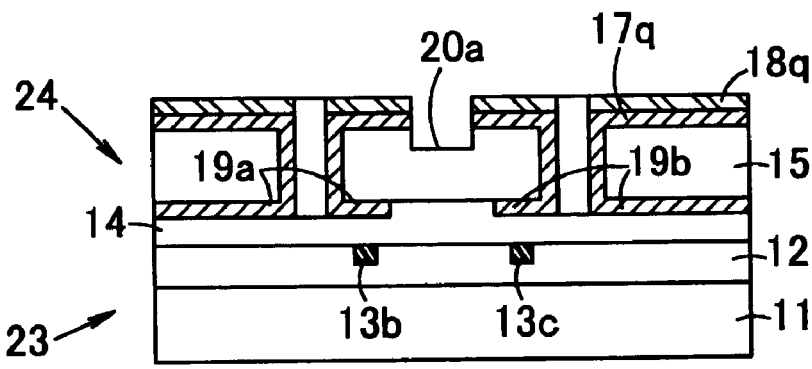

As shown in FIGS. 10A, 10B, and 10C, the optical waveguide 23 is manufactured by coating an ultraviolet-ray curing resin 12a having a relatively high refractive index on the glass substrate 11, and core grooves 31 are formed by pressing the resin 12a with a stamper 21, and the lower cladding layer 12 is formed by curing the resin 12a by irradiating ultraviolet rays thereto. A resin having a refractive index higher than that of the lower cladding layer 12 shown in FIG. 10D is dropped into the core grooves 31 and cured with the surfaces thereof flattened by being pressed, thereby the core 13a to 13e are formed.

Next, as shown in FIG. 11A, an uncured resin 14a, which is used to make the upper cladding layer 14a, is dropped onto the upper surfaces of the cores 13a to 13d and expanded over the entire lower cladding layer 12 by a spin coater, and the optical waveguide 23 is bonded to the optical modulator 24 through the upper cladding layer 14 as shown in FIG. 11B.

Next, as shown in FIG. 11C, electrode separation grooves 20a are formed by chipping off the wire bond pad portion 18q, the conductive film 17q, and the a part of the glass sheet 15 located above between the cores 13b and 13c with a dicing blade.

Figure 12:
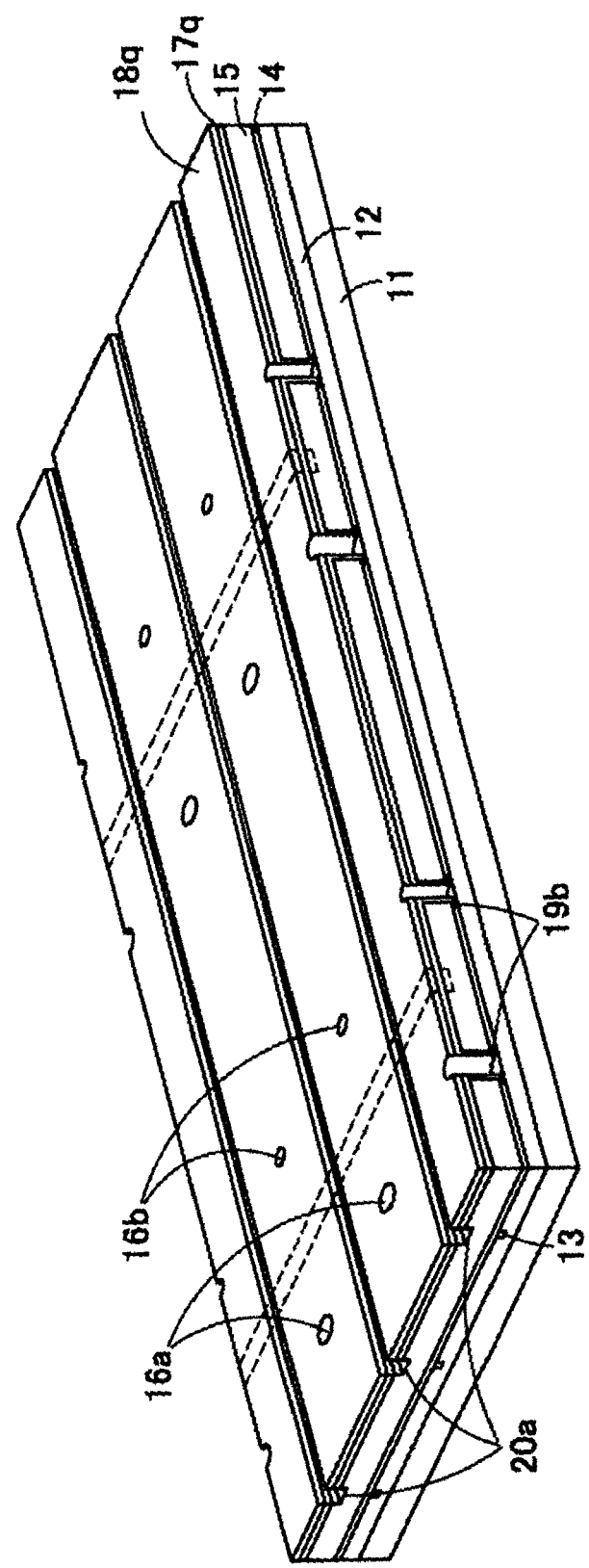
FIG. 12 shows a view continued from FIGS. 11A to 11C.
Figure 13:
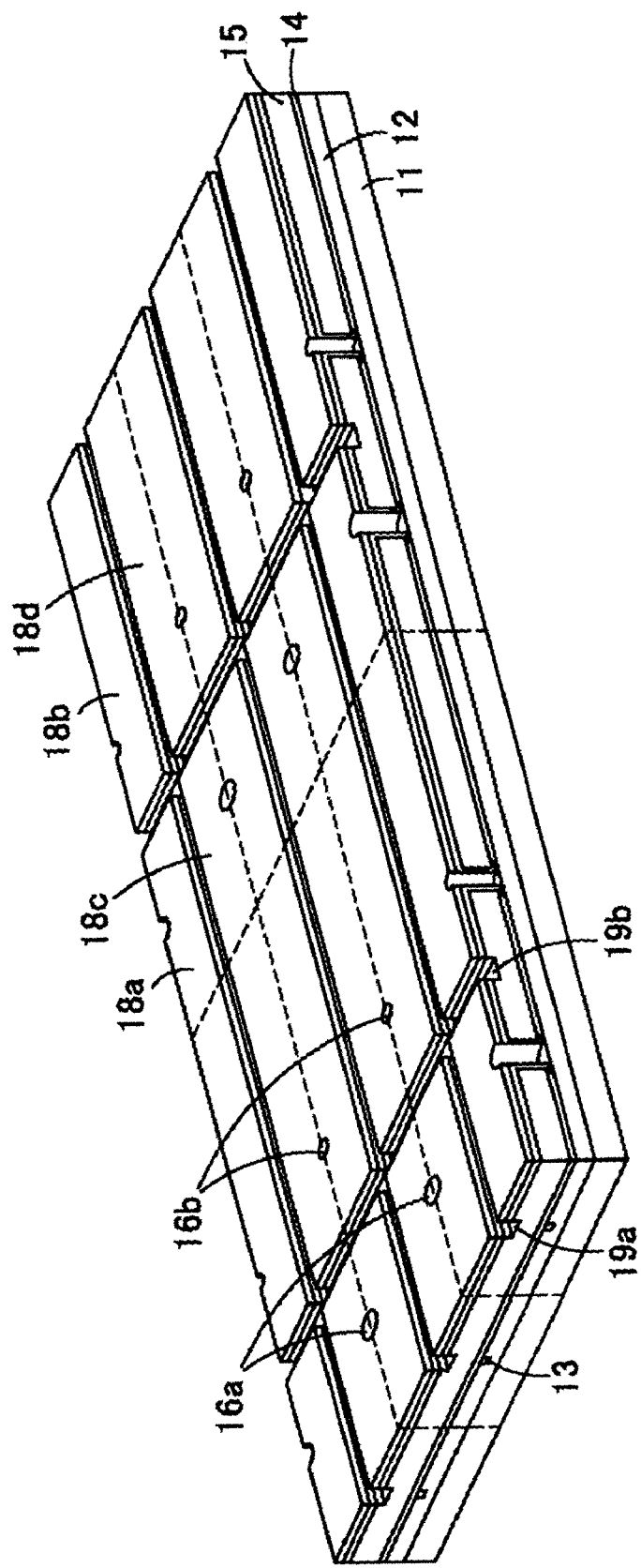
FIG. 13 shows a view continued from FIG. 12.

Next, the wire bond pad portion 18q, the conductive film 17q, and the a part of the glass sheet 15 shown by broken lines in FIG. 12 are chipped off with a dicing blade, and are further cut off along broken lines shown in FIG. 13 so as to pass through centers of the through-holes 16a and 16b, respectively, as shown in FIG. 13. In doing so, the electrodes 17a to 17d and the wire bond pads 18a to 18d are formed, thereby the optical waveguide device 10a shown in FIG. 5 is completed.

According to the method of manufacturing the optical waveguide device 10a of this embodiment, the optical waveguide 23 and the optical modulator 24, which are manufactured separately, are bonded to each other by the adhesive (upper cladding layer), and the elements 19a and 19b are disposed on the cores 13. Accordingly, processes in which heat and a chemical agent are applied to the cores 13a to 13e and the upper cladding layer 14 are not required. Thus, there is not a possibility that the cores 13a to 13e and the upper cladding layer 14 are degraded. Further, the elements 19a and 19b are manufactured in the processes separated from the processes for manufacturing the cores 13a to 13c, the lower cladding layer 12, and the upper cladding layer 14. Thus, there is not a possibility that the cores 13a to 13c are damaged in the manufacturing processes of the elements 19a and 19b. Thus, the manufacturing processes of the elements 19a and 19b are not restricted by a heating temperature and the like, thereby the elements 19a and 19b are unlikely to be exfoliated. Further, the elements 19a and 19b are protected by being sandwiched between the upper cladding layer 14 and the glass sheet 15. Thus, there is not a possibility that they are exfoliated and damaged.

Further, in the optical waveguide device 10a of this embodiment, the elements 19a and 19b are brought into conduction with the electrodes 17a to 17d in the inside of the glass sheet 15 and the elements 19a and 19b have no wiring on the surface on which they are formed. Thus, there is not a possibility that the light transmitted in the insides of the cores 13a to 13e is affected by the heat generated by the wiring of the elements and the change of an electric field and a magnetic field caused by the wiring.

Further, in the optical waveguide device 10a of this embodiment, the electrodes 17a to 17d and the wire bond pads 18a to 18d, and the elements 19a and 19b are formed on the confronting surfaces of the glass sheet 15. In doing so, the distance between the electrodes 17a to 17d and the wire bond pads 18a to 18d, and the cores 13 can be sufficiently increased by increasing the thickness of the glass sheet 15. Therefore, even if the cores 13 are disposed near to the elements 19a and 19b by reducing the thickness of the upper cladding layer 14, the light propagating in the cores 13 is not affected by the heat generated in the wire bond pads 18a, 18b, 18c, and 18d and the electrodes 17a to 17d and the change of the electric field and the magnetic field caused therein. Further, the cores 13 can be effectively heated by a small amount of power consumption by reducing the thickness of the upper cladding layer 14. Thus, it is possible to miniaturize the optical waveguide device 10a and to reduce the cost thereof by composing the elements 19a and 19b of small heaters having small power consumption.

It should be noted that an optical waveguide device similar to the optical waveguide device 10a of this embodiment can be also manufactured in such a manner that after the optical modulator 24 is formed by the manufacturing processes described above, a resin, which is used to make the upper cladding layer 14, is dropped onto the surface on which the elements 19a and 19b of the optical modulator 24 are formed, the core grooves 31 and the cores 13a to 13e are sequentially formed on the surface of the upper cladding layer 14 by the duplicating method (stamper method) explained using FIG. 10, and further a resin, which is used to make the lower cladding layer 12, is dropped and pressed against the glass substrate 11 and cured.

Second Embodiment

Figure 14:
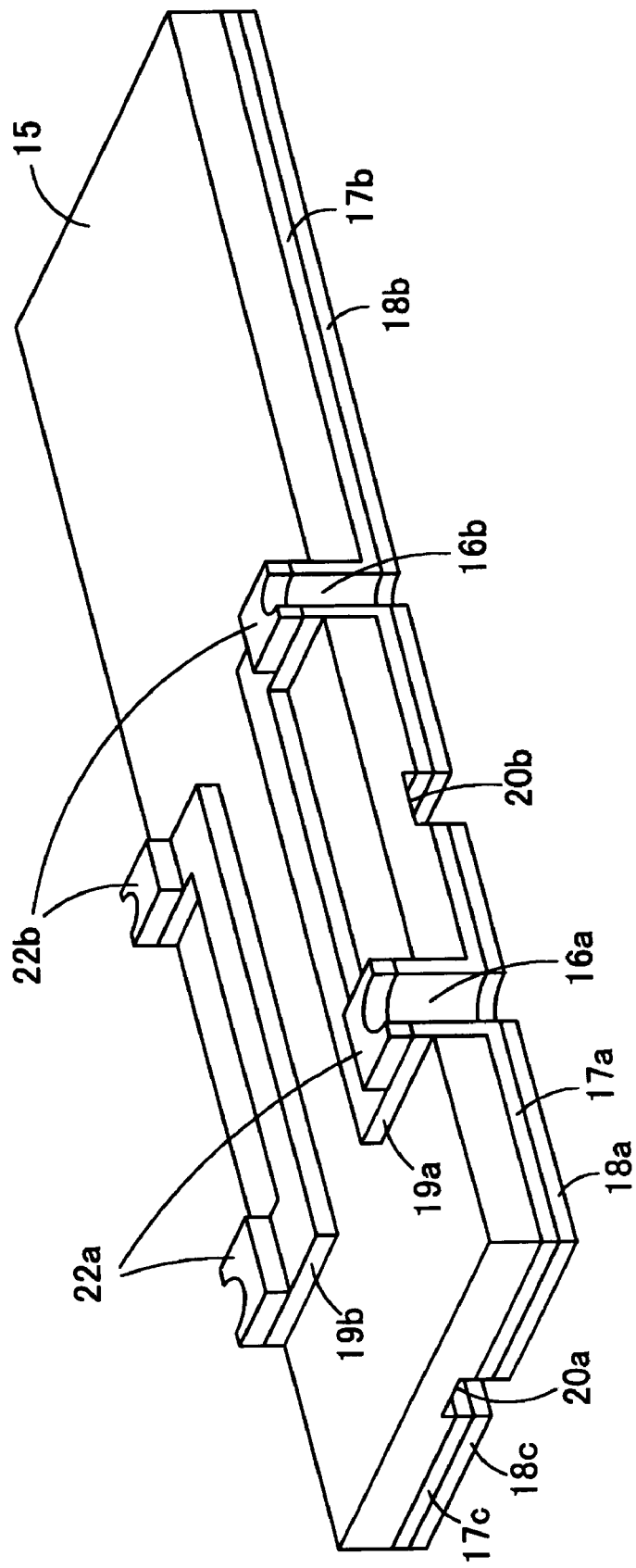
FIG. 14 shows a schematic perspective view of an optical modulator of an optical wave guide device according to another embodiment of the present invention.

FIG. 14 shows a schematic perspective view of an optical modulator 24 of an optical wave guide device according to another embodiment of the present invention. The optical modulator 24 shown in FIG. 14 is used in combination with an optical waveguide having cores and a clad surrounding the cores as explained in the first embodiment and as shown in FIG. 6.

The optical modulator 24 shown in FIG. 14 is composed of a glass sheet 15, electrodes 17a, 17b, 17c, and 17d, wire bond pads 18a, 18b, 18c, and 18d, elements (heaters) 19a and 19b, and spacers 22a and 22b. The spacers 22a and 22b are formed only in the vicinities of through-holes 16a and 16b located at both ends of the optical modulator 24.

Figure 15:
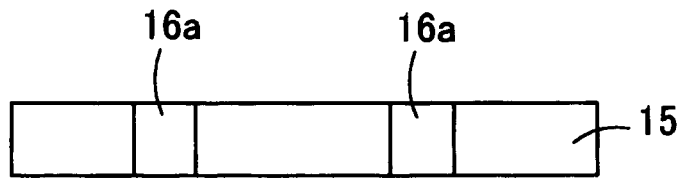
FIGS. 15A, 15B, 15C, 15D, and 15E show views explaining manufacturing processes of the optical modulator shown in FIG. 14.
Figure 15:
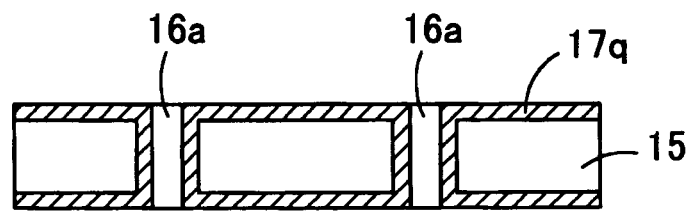
Figure 15:
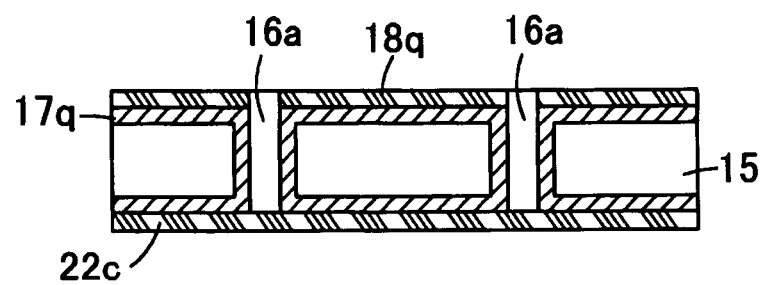
Figure 15:
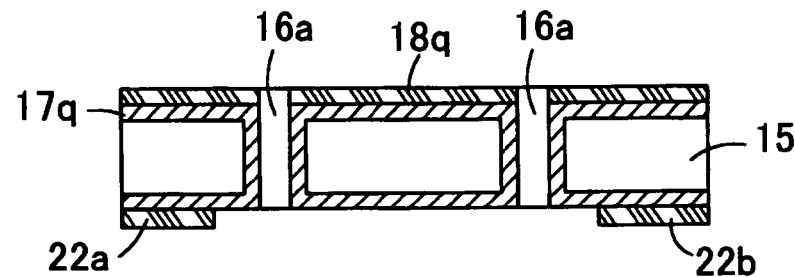
Figure 15:
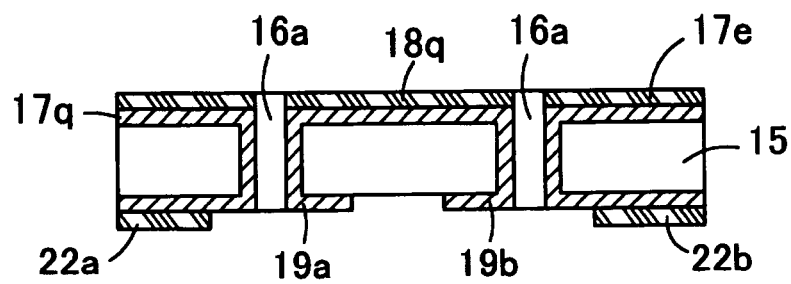

Next, a method of manufacturing the optical modulator 24 of the embodiment will be explained. As shown in FIG. 15A, the through-holes 16a (16B) are formed so as to pass through the glass sheet 15 from a front surface to a back surface, and conductive films 17q shown in FIG. 15B are formed by first sputtering or vapor depositing titanium (Ti) on the upper and lower surfaces of the glass sheet 15 and on the inner surfaces of the through-holes.

Next, as shown in FIG. 15C, a wire bond pad portion 18q and a spacer portion 22c are formed by vapor depositing aluminum (Al) on the surfaces of the conductive films 17q on the front and back surfaces of the glass sheet.

Next, as shown in FIG. 15D, spacers 22a and 22b are formed by etching the spacer portion 22c while masking a part thereof. Further, as shown in FIG. 15B, the elements 19a and 19b are formed by etching the exposed conductive films 17q while masking a part thereof.

Thereafter, the optical modulator 24 may be completed by forming the electrodes 17a to 17d from the conductive film 17q on the glass sheet 15 and by forming the wire bond pads 18a to 18d from the wire bond pad portion 18q. However, the electrodes 17a to 17d and the wire bond pads 18a to 18d are separated individually in subsequent processes to simplify manufacturing processes. In the following description, what is formed in the above processes will be called the optical modulator 24.

Figure 16:
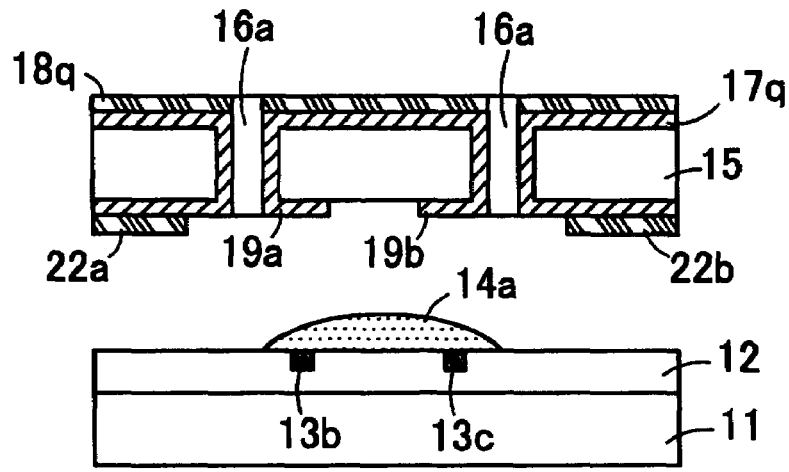
FIGS. 16A, 16B, and 16C show views explaining processes for integrating the optical modulator shown in FIG. 15D with an optical waveguide.
Figure 16:
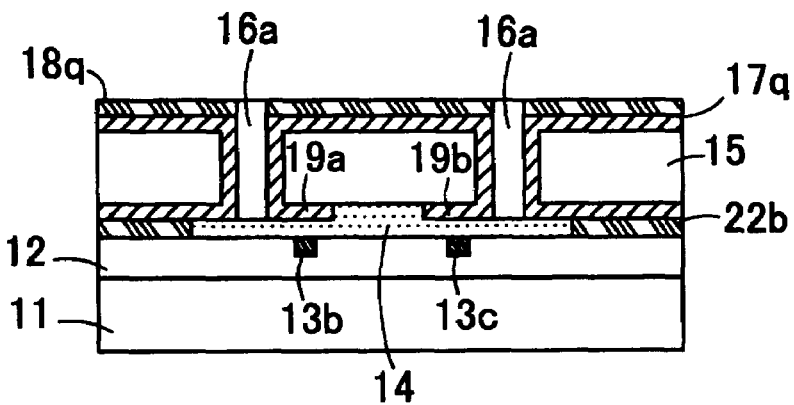
Figure 16:
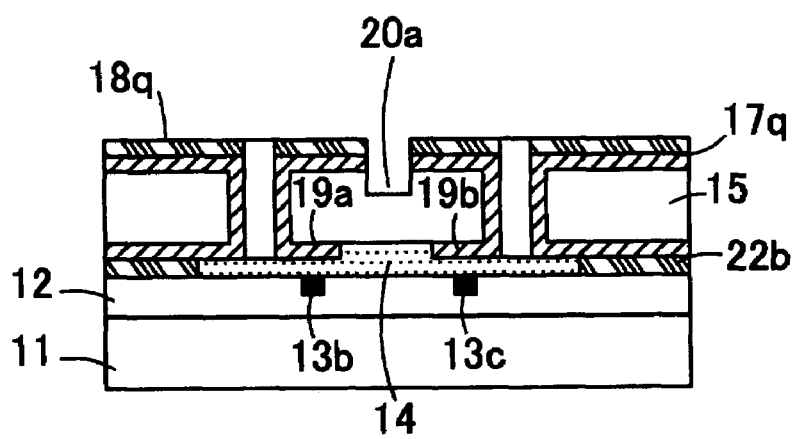

Next, as shown in FIG. 16A, an uncured resin 14a, which is used to make an upper cladding layer 14, is dropped onto the optical waveguide device 23 manufactured by the manufacturing method explained in the first embodiment and shown in FIG. 10, and the optical wave guide 23 is bonded to the optical modulator 24 through the upper cladding layer 14 as shown in FIG. 16B.

Next, as shown in FIG. 16C, electrode separation grooves 20a are formed by chipping off the wire bond pad portion 18q, the conductive film 17q, and a part of the glass sheet 15 located above between the cores 13b and 13c with a dicing blade. Thereafter, the optical waveguide device is completed through the same processes as those shown in the first embodiment, that is, by forming the electrode separation grooves 20a and cutting off the optical wave guide 23 bonded to the optical modulator 24 so as to form respective optical waveguide devices.

As in the optical waveguide device shown in the first embodiment, in the case that the optical waveguide 23 is bonded to and integrated with the optical modulator 24 through the resin acting as the upper cladding layer 14, the thickness of the upper cladding layer 14 is varied depending on the amount and the viscosity of the resin to be coated, pressure force applied to the resin in bonding, and the like. If the upper cladding layer 14 has a different thickness, when the power supply of the elements 19a and 19b is turned on, they heat cores at a different temperature and the refractive indices of the cores are changed differently, which makes the performance of the optical waveguide device unstable. However, provision of the spacers as in the optical waveguide device of this embodiment can make the distances between the cores and the elements approximately constant, thereby the performance of the optical waveguide device can be made more stable.

Third Embodiment

Figure 17:
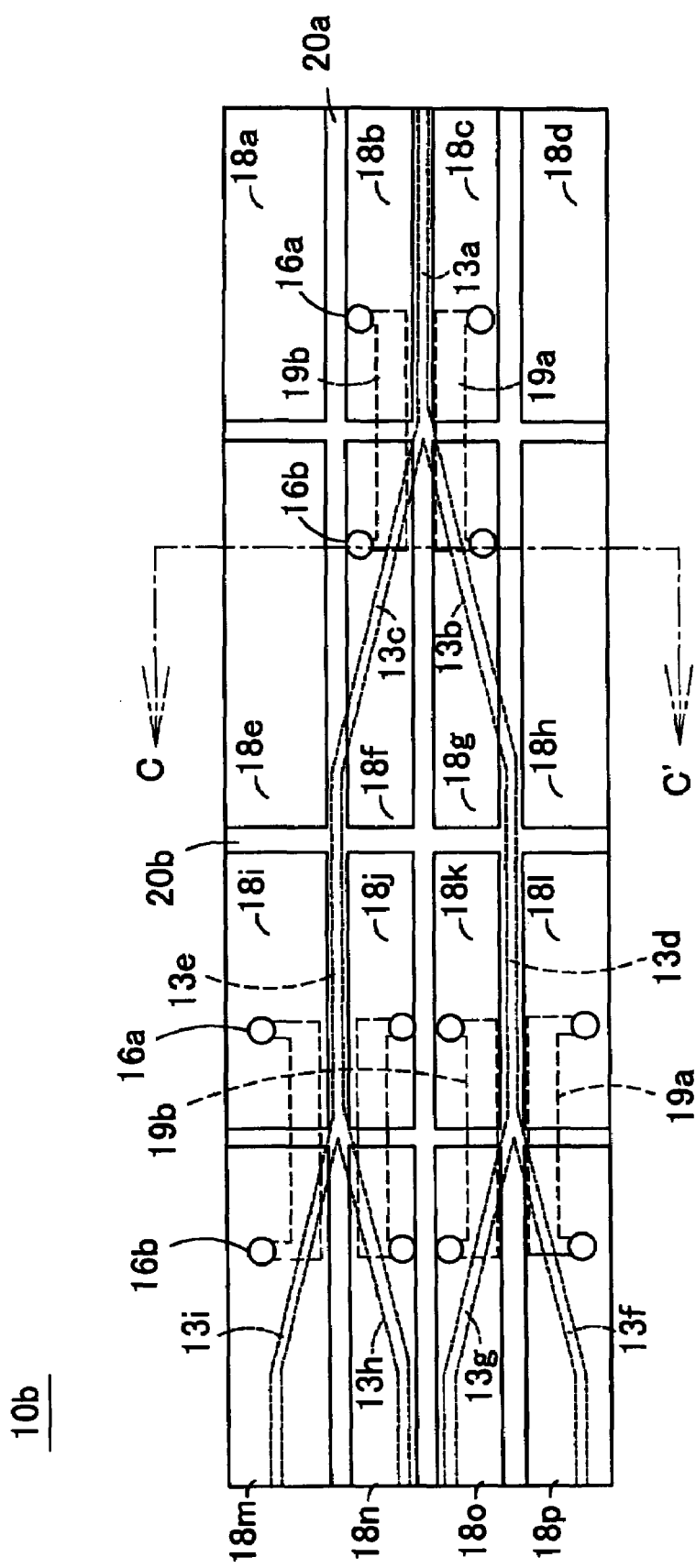
FIG. 17 shows a schematic plan view of an optical waveguide device according to still another embodiment of the present invention.
Figure 18:
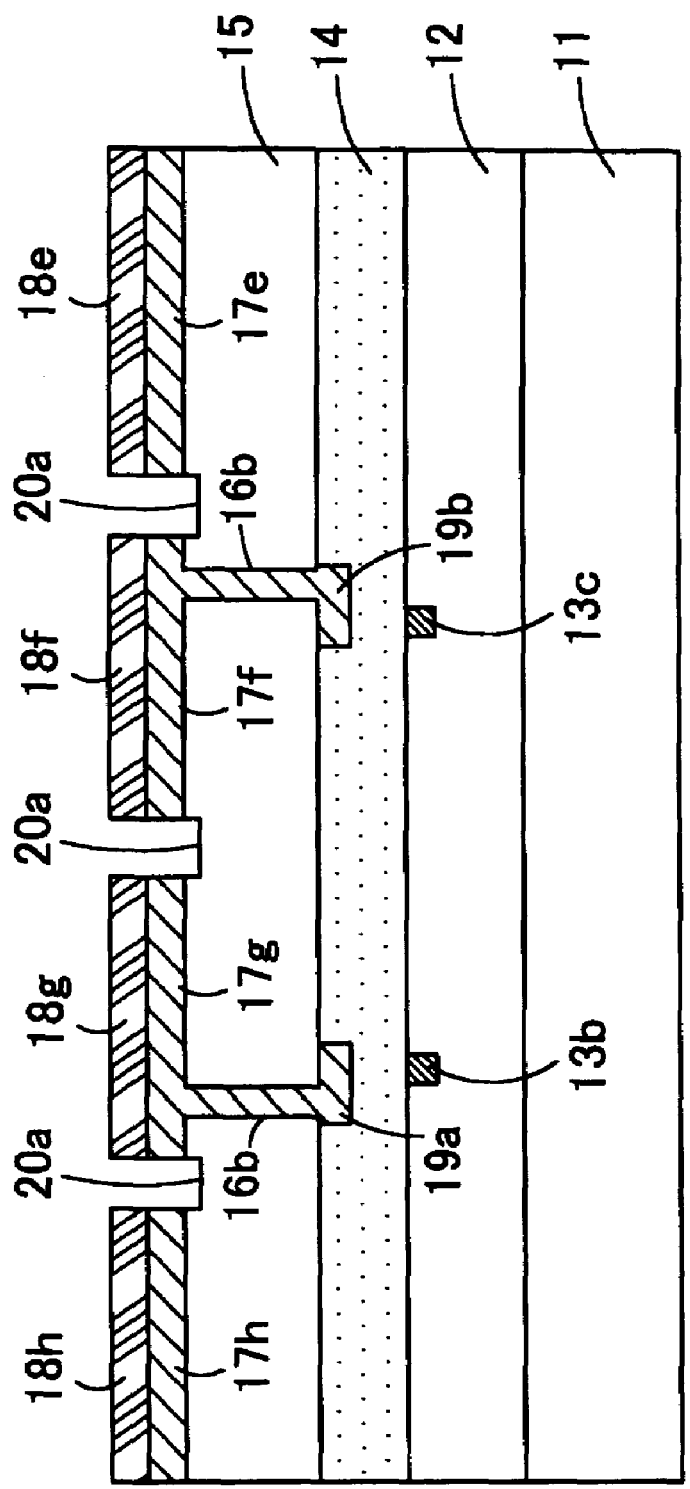
FIG. 18 shows a sectional view of the optical waveguide device taken along the line C-C' of FIG. 17.

FIG. 17 shows a schematic plan view showing an optical waveguide device 10b (1×4 optical switch) according to still another embodiment of the present invention. Further, FIG. 18 shows a sectional view of the optical waveguide device 10b taken along the line C-C' of FIG. 17.

The optical waveguide device 10b is composed of a glass substrate 11, a lower cladding layer 12, cores 13a, 13b, 13c, 13d, 13e, 13f, 13g, 13h, and 13i, an upper cladding layer 14, elements (heaters) 19a and 19b, a glass sheet 15 through which through-holes 16a and 16b are formed, electrodes 17a to 17p, and wire bond pads 18a to 18p formed on the upper surfaces of the electrodes 17a to 17p. The through-holes 16a and 16b are formed so as to pass through the glass sheet 15 from an upper surface to a lower surface, and the elements 19a and 19b on the lower surface of the glass sheet 15 are brought into conduction with the electrodes 17b, 17c, 17f, 17g, 17i, 17j, 17k, 17l, 17m, 17n, 17o, and 17p on the upper surface of the glass sheet 15 through the through-holes 16a and 16b. The wire bond pads 18a, 18d, 18e, and 18h, and the electrodes 17a, 17d, 17e and 17h are arranged as dummies and are not used actually. The optical waveguide device 10b of this embodiment is manufactured by the manufacturing method shown in the first embodiment.

The elements 19a and 19b are disposed above the vicinities of the branched portions of the cores 13b, 13c, 13f, 13g, 13h, and 13i through the upper cladding layer 14. The electrodes 17b, 17c, 17f, 17g, 17i, 17j, 17k, 17l, 17m, 17n, 17o, and which are connected to the elements 19a and 19b, are disposed by being further spaced apart from the elements 19a and 19b through the glass sheet 15. Since a core through which incident light is transmitted can be selected by turning on and off the power supply of the elements 19a and 19b, the light can be caused to outgo from any one or a plurality of four core ends acting as light outgoing ends.

According to the optical waveguide device 10b of this embodiment, even if the elements 19a and 19b are disposed near to the cores 13b, 13c, 13f, 13g, 13h, and 13i by reducing the thickness of the upper cladding layer 14, the cores 13a to 13i can be sufficiently separated from the electrodes 17a to 17p through the thick glass sheet 15. Accordingly, the light transmitted through cores is not affected by the heat generated by the electrodes 17a to 17p and the wire bond pads 18a to 18p and by the change of an electric field and a magnetic field caused thereby. Further, since the wiring of the elements 19a and 19b is not formed on the same surface as that on which the elements 19a and 19b are formed but is disposed in a vertical direction, heat generated by the wiring and the change of the electric field and the magnetic filed caused thereby are unlike to affect the light propagating in the cores. Accordingly, an optical waveguide device (optical switch) can be arranged which has a plurality of cores and heaters disposed in a narrow space and a plurality of branched portions.

Fourth Embodiment

Figure 19:
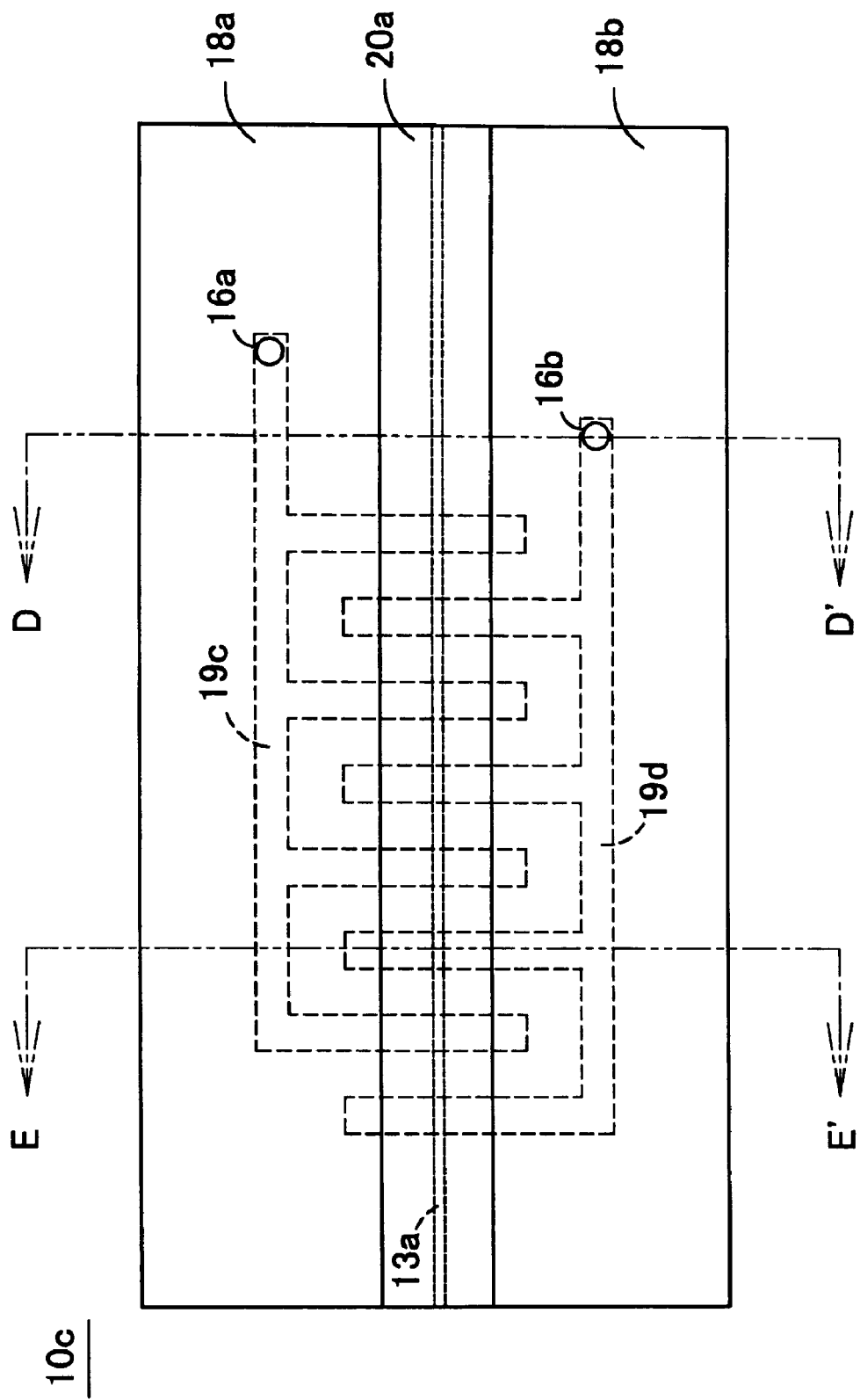
FIG. 19 shows a schematic plan view of an optical waveguide device according to a further embodiment of the present invention.

FIG. 19 shows a schematic plan view of an optical waveguide device 10c (optical modulator) according to a further embodiment of the present invention. FIGS. 20A and 20B are sectional views of the optical waveguide device 10c taken along the lines D-D' and E-E' of FIG. 19. The optical waveguide device 10c of this embodiment is composed of a glass substrate 11, a lower cladding layer 12, a core 13a, an upper cladding layer 14, comb-shaped elements (comb-shaped electrodes) 19c and 19d, through-holes 16a and 16b, a glass sheet 15, electrodes 17a and 17b, and wire bond pads 18a and 18b.

The optical waveguide device 10c of this embodiment can be manufactured by the same method as that shown in the first embodiment. The elements 19c and 19d can be manufactured by the same manufacturing processes as those of the elements 19a and 19b explained in the first embodiment and shown in FIGS. 9A and 9B, that is, the elements 19c and 19d can be formed by etching a conductive film 17q formed on the lower surface of the glass sheet 15. The wire bond pad 18a is separated from the wire bond pad 18b and the electrode 17a is separated from the electrode 17b by electrode separation grooves 20a. In the optical waveguide device 10c, when the wire bond pads 18a and 18b are connected to an external power supply and ac currents having an inverted phase are supplied to the elements 19c and 19d through the electrodes 17a and 17b, the refractive index of the core 13a is changed by an electric field generated between the elements 19c and 19d, thereby the light transmitted in the core can be modulated.

Fifth Embodiment

Figure 21:
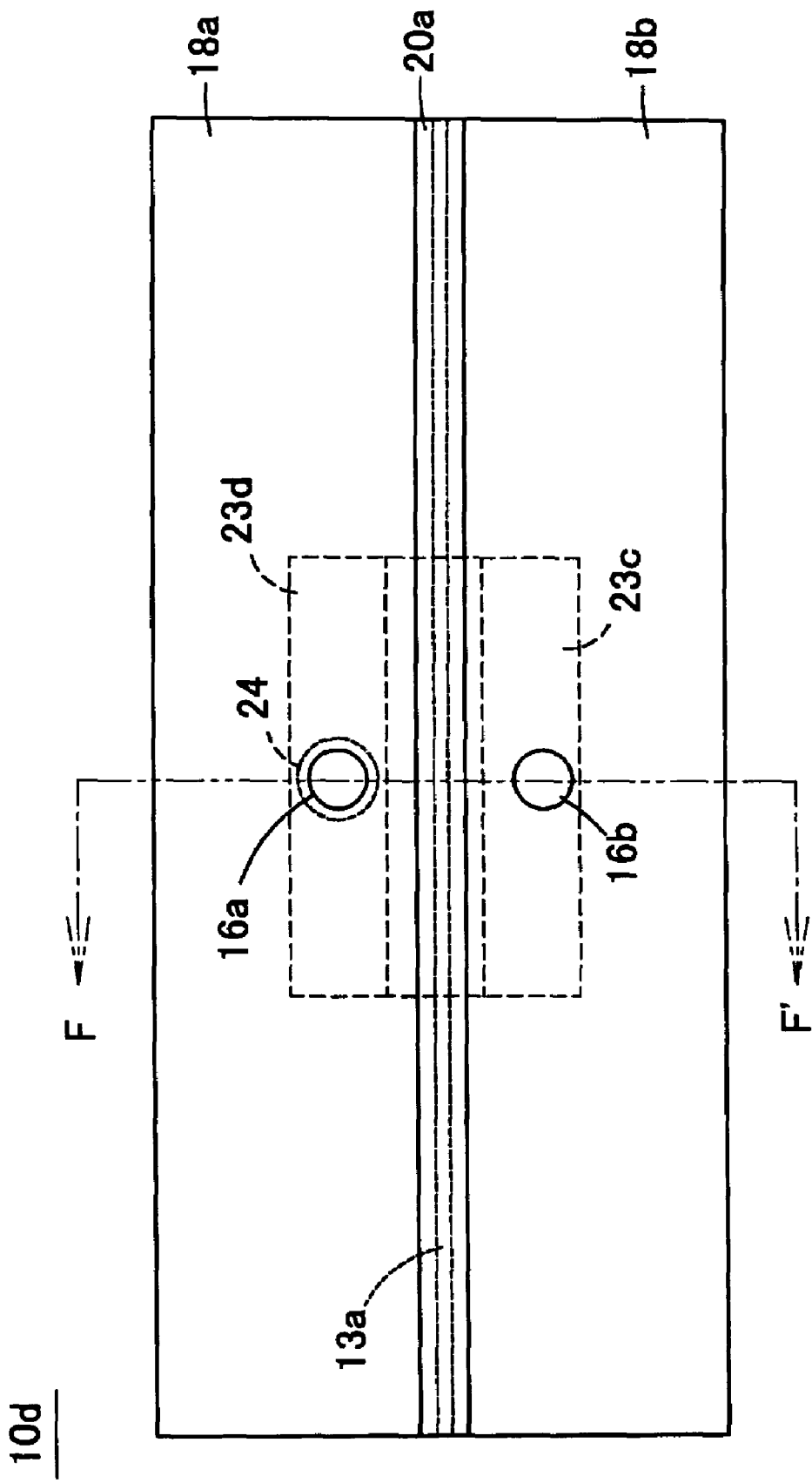
FIG. 21 shows a schematic plan view of an optical waveguide device according to a still further embodiment of the present invention.
Figure 22:
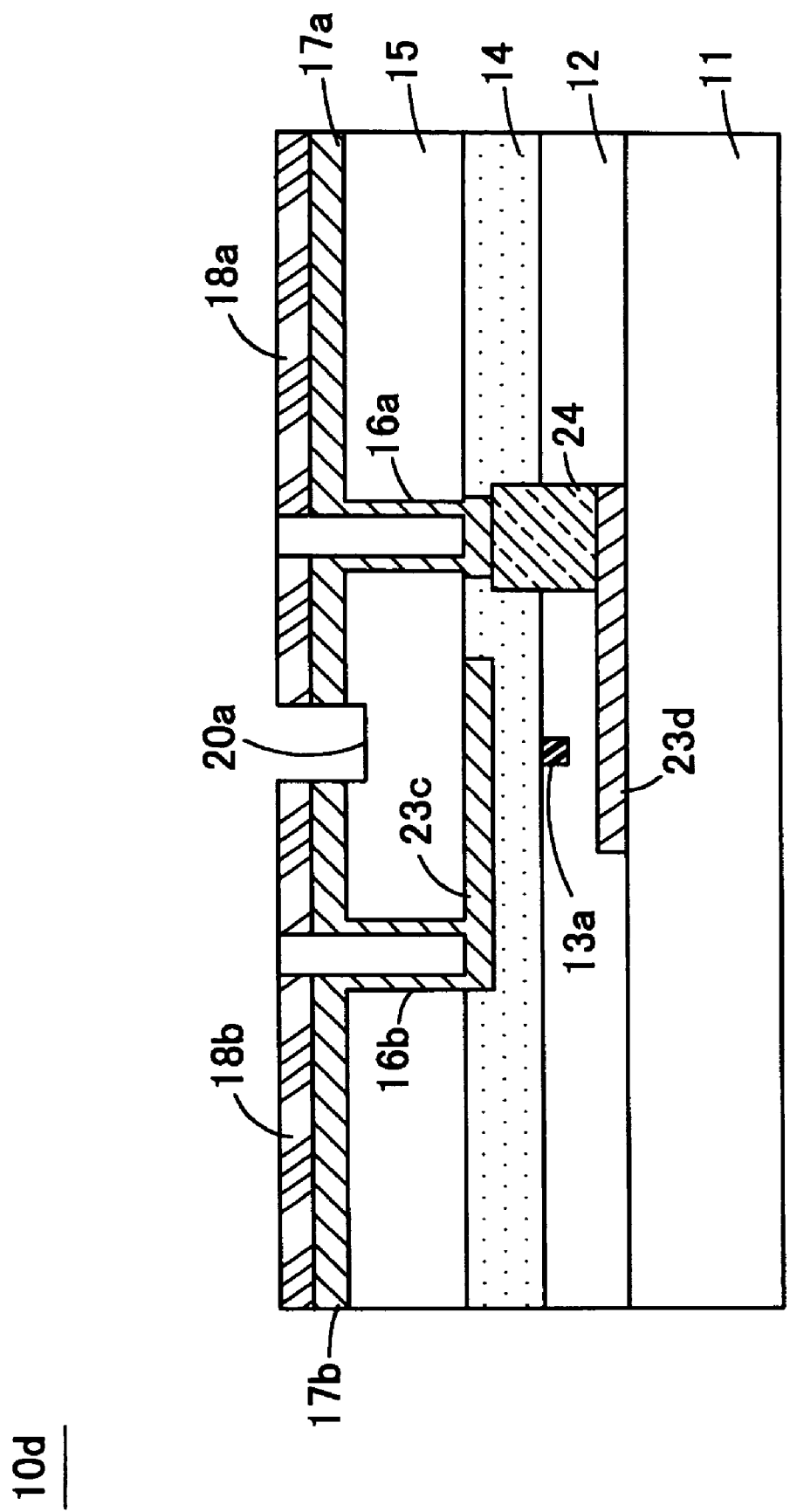
FIG. 22 shows a sectional view of the optical waveguide device taken along the line F-F' of FIG. 22.

FIG. 21 shows a schematic plan view of an optical waveguide device 10d (optical modulator) according to a still further embodiment of the present invention. FIG. 22 shows a sectional view of the optical waveguide device 10d taken along the line F-F' of FIG. 21. The optical waveguide device 10d of this embodiment is composed of a glass substrate 11, a lower cladding layer 12, a core 13a, a lower electrode 23d formed below the core 13a, an upper electrode 23c formed above the core 13a, an upper cladding layer 14, a glass sheet 15, electrodes 17a and 17b, and wire bond pads 18a and 18b.

Figure 1:
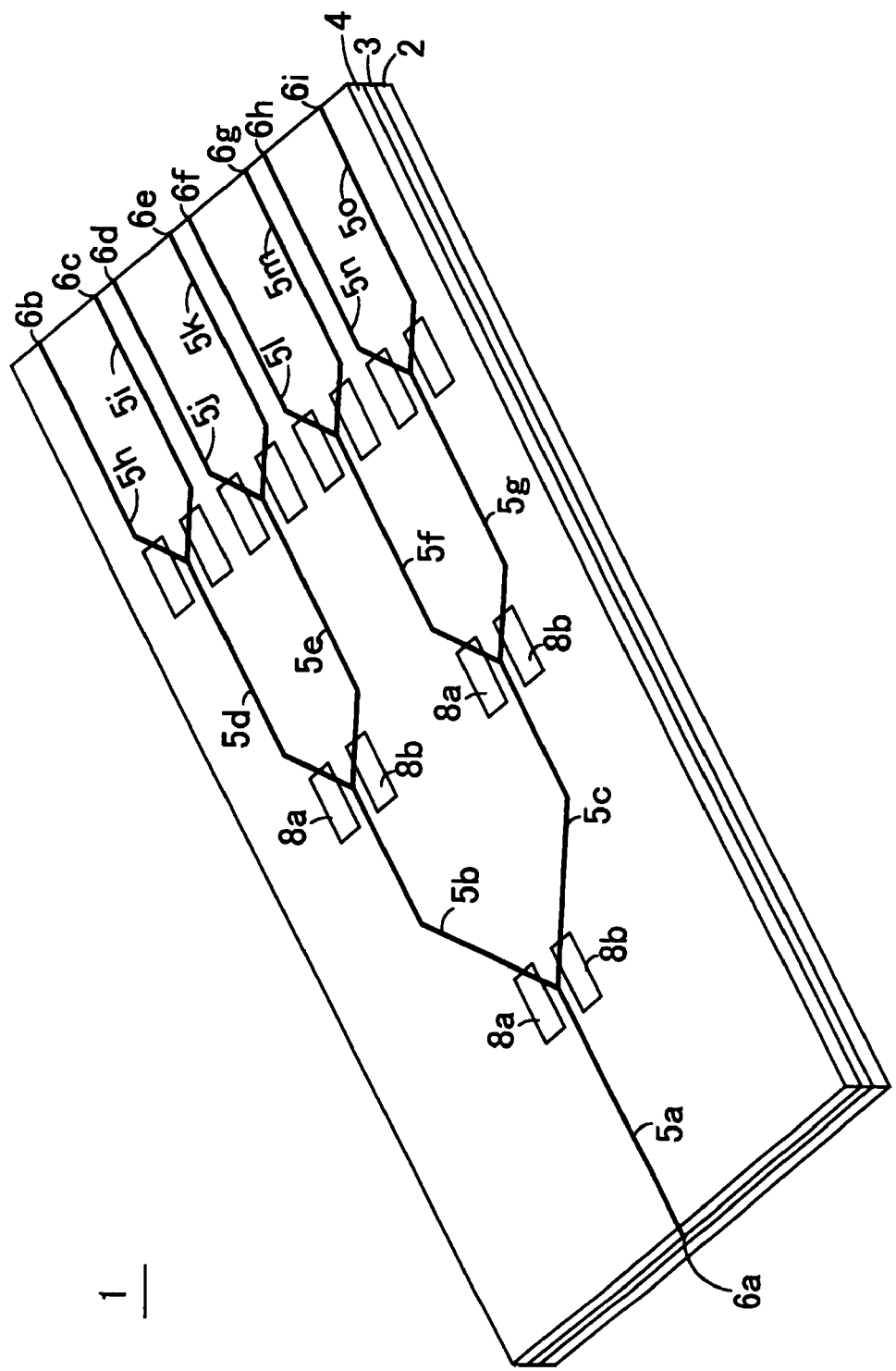
FIG. 1 shows a schematic perspective view of a conventional optical waveguide device.
Figure 2:
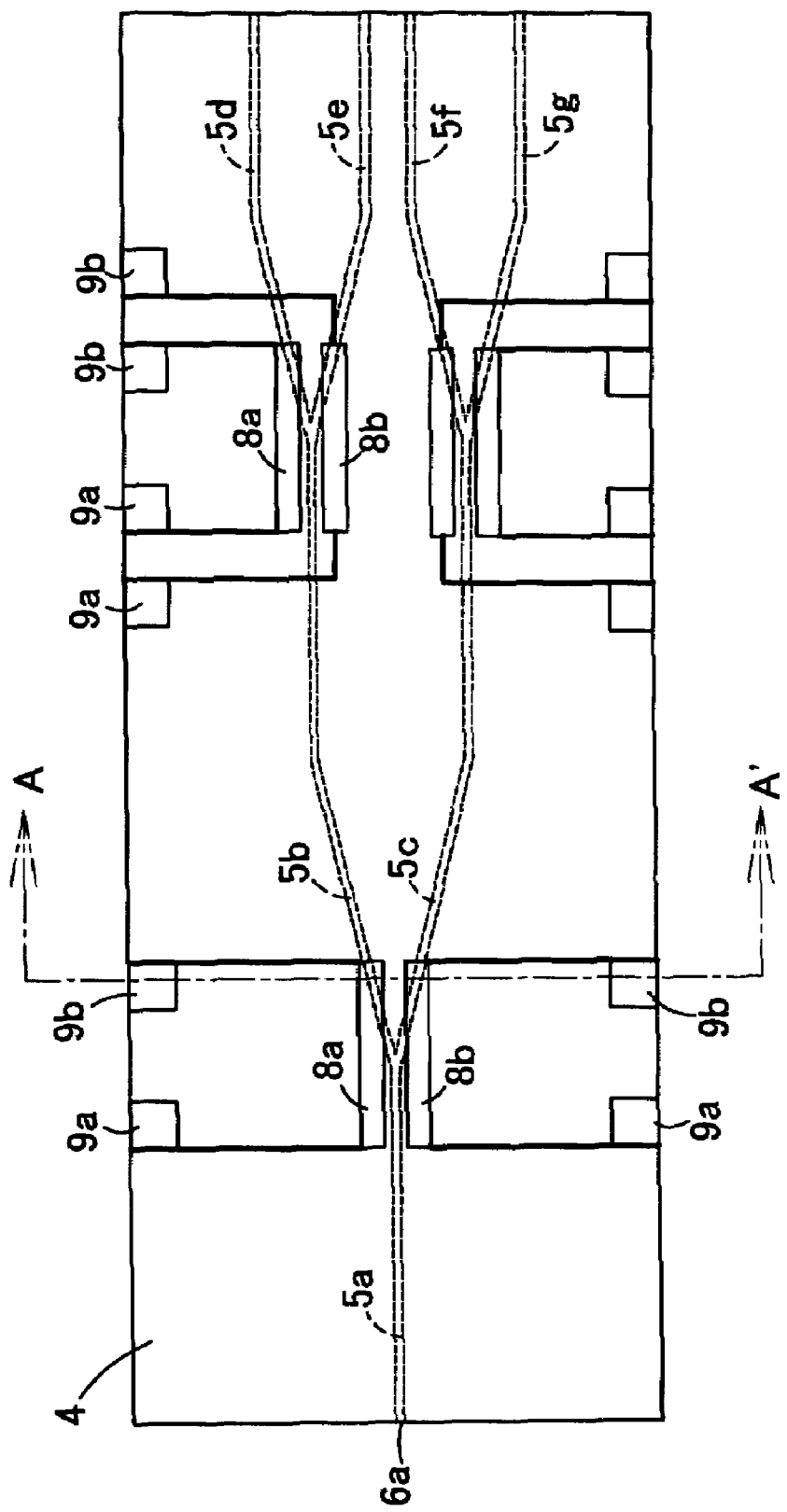
FIG. 2 shows a schematic pan view partly in enlargement of the conventional optical waveguide device shown in FIG. 1.
Figure 3:
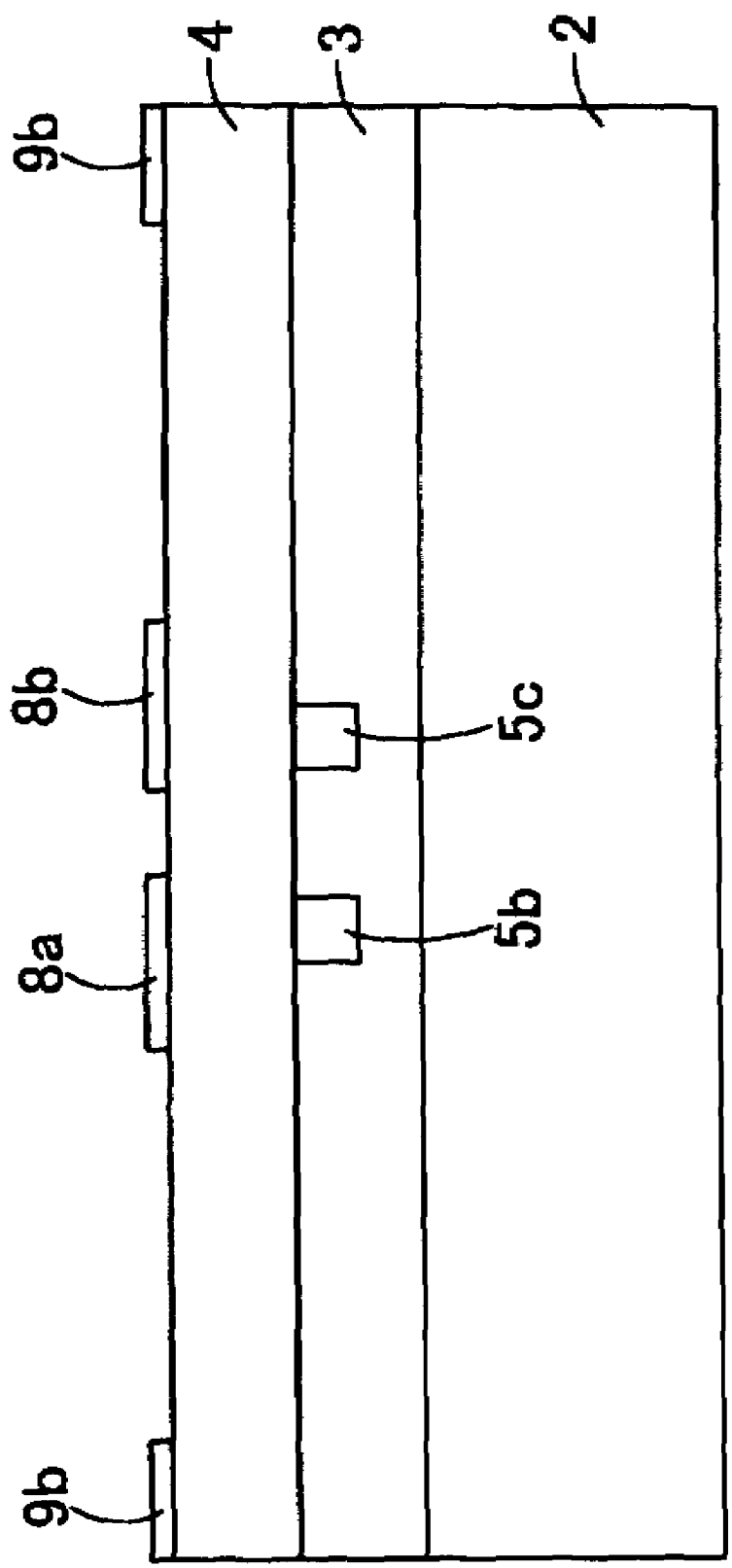
FIG. 3 shows a sectional view of the optical waveguide device taken along the line A-A' of FIG. 2.
Figure 4:
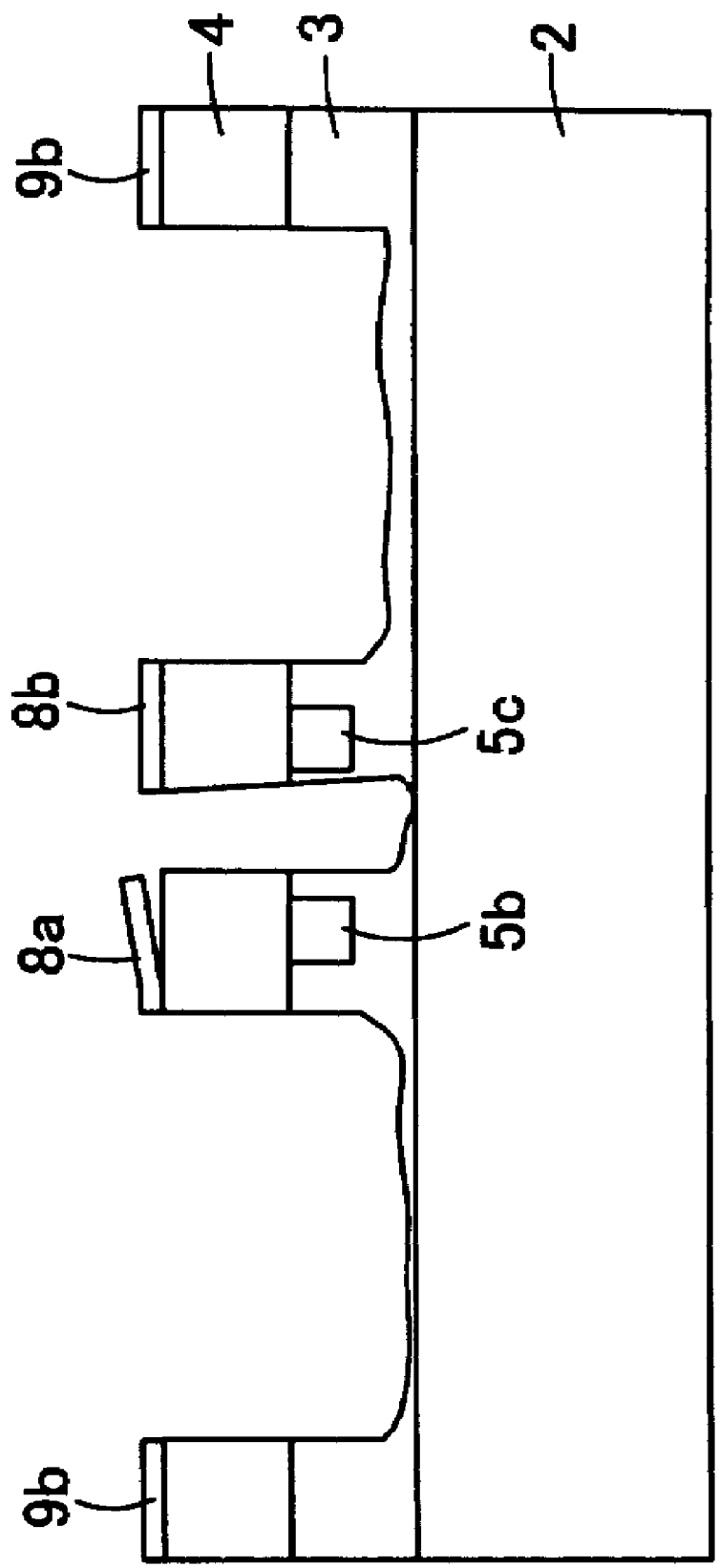
FIG. 4 shows a view explaining problems of the conventional optical waveguide device.

The optical waveguide device 10d of this embodiment can be manufactured by approximately the same manufacturing processes as those explained in the first embodiment. The lower electrode 23d is formed on the substrate 11 by vapor deposition or the like of a metal thin film, and then the lower cladding layer 12, the core 13a and the upper cladding layer 14 are formed on the lower electrode 23d. Thereafter, a drawing-out electrode 24, which passes through the upper and lower cladding layers 14 and 12, is formed, and the lower surface of the drawing-out electrode 24 is electrically connected to the lower electrode 23d. Note that the lower cladding layer 12 and the like may be formed after the lower electrode 23d and the drawing-out electrode 24 are formed on the substrate 11. Thereafter, the optical waveguide device 10d may be manufactured by the manufacturing method explained in the first embodiment. The upper electrode 23c is formed by etching a conductive film 17q formed on the lower surface of the glass sheet 15 as described in the first embodiment and shown in FIGS. 4C and 4D.

The wire bond pads 18a and 18b are connected to an external power supply. The optical waveguide device 10d of the embodiment can modulate the light transmitted through the core by changing the refractive index of the core by the change of an electric field generated by a lower electrode 25a and an upper electrode 25b.

Sixth Embodiment

Figure 23:
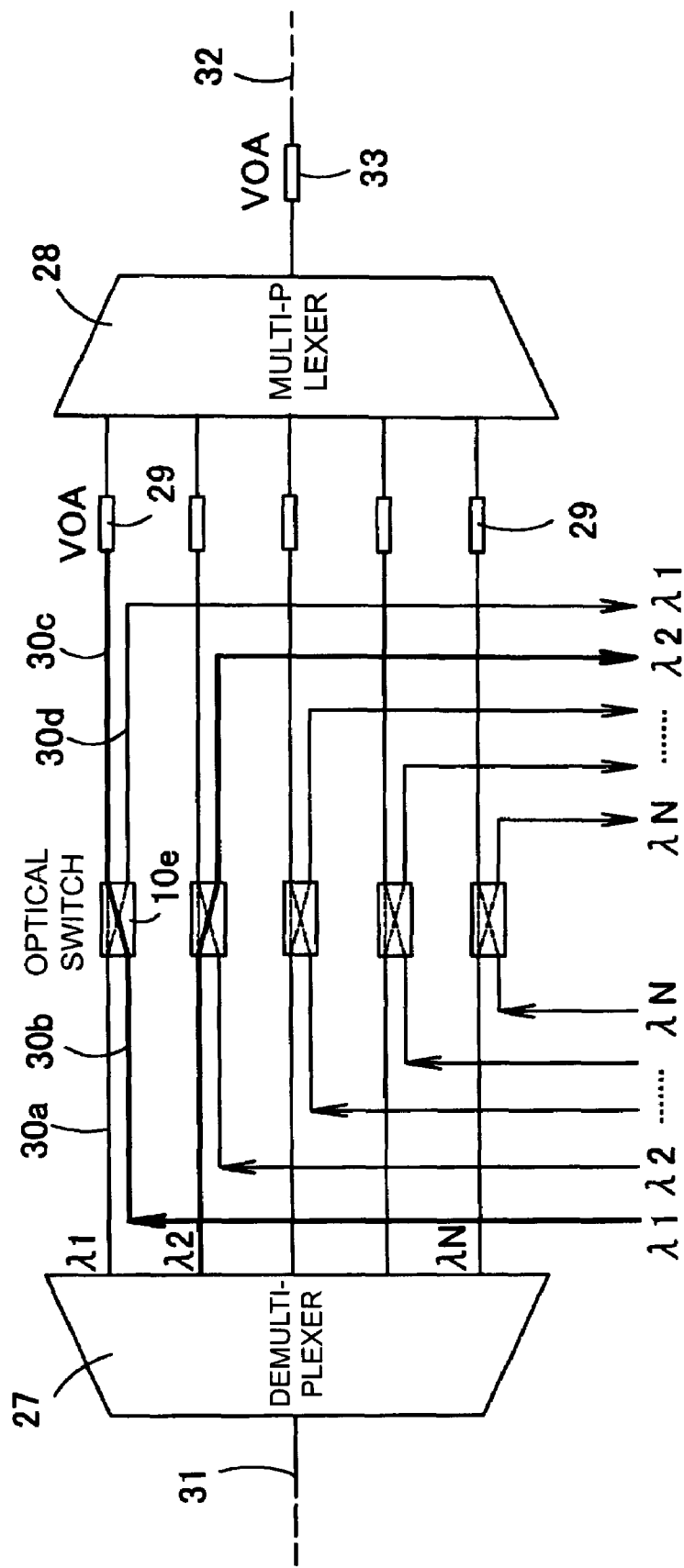
FIG. 23 shows a view explaining an optical communication system making use of the optical waveguide device of the present invention.

FIG. 23 shows a schematic view showing a device for multiplexing and demultiplexing light using light attenuators 29 and 33 (for example, optical waveguide device as shown in FIG. 5) of the present invention. A demultiplexer 27 and a multiplexer 28 are devices used in an optical communication system employing a wavelength multiplexing method (WDM) for transmitting a plurality of optical signals having a different wavelength through a single optical fiber. The demultiplexer 27 is a device for demultiplexing each wavelength of optical signals transmitted through a single optical fiber 31 and outputting it to a different optical fiber. Further, the multiplexer 28 is a device for multiplexing optical signals having a different wavelength, which is input through a plurality of optical fibers, and outputting the multiplexed optical signal to a single optical fiber 32. Note that optical waveguide device 10e according to the present invention may be used as an optical switch.

As shown in the third embodiment, each of optical waveguide devices 10e (2×2 optical switch) is an optical waveguide device capable of causing light to outgo only from a particular selected core by switching a traveling direction of light transmitted in a core. Light attenuators (VOA) 29 and 33 are composed of the light attenuator shown in the first embodiment. Each optical waveguide device 10e has two light incidententrances. One of them is connected to the demultiplexer 27 through an optical fiber 30a so that light, which has wavelengths λ1, λ2 ..., λN and is demultiplexed by the demultiplexer 27, is input thereto. The other is an incident end of light signals transmitted in an optical fiber 30b which is not connected to the demultiplexer 27. The optical fiber 30b may be connected to a demultiplexer other than the demultiplexer 27.

Each optical waveguide device 10e has two light outgoing ends. One of is connected to the multiplexer 28 through an optical fiber 30c via a light attenuator (VOA) 29, and the other is connected to an optical fiber 30d which is not connected to the demultiplexer 27. The optical fiber 30d may be connected to a multiplexer other than the multiplexer 28.

With the above arrangement, in the optical communication system using the multiplexer and the demultiplexer, optical fibers 31 and 32 constitute a transit network trunk in, for example, an urban network and an interurban network and transmit wavelength multiplexed signals. Now, it is assumed that all the optical waveguide devices 10e are connected to the multiplexer 28. The wavelength multiplexed signals, which are transmitted in the transit network trunk composed of the optical fiber 31, are demultiplexed to signals having the respective wavelengths λ1, λ2 ..., λN by the demultiplexer 27 and transmitted toward the multiplexer 28 through the respective optical switches 10e. Thereafter, the powers of the signals are made uniform by the light attenuators 29 and the signals having the respective wavelengths λ1, λ2 ..., λN are multiplexed again by the multiplexer 28. Further, the multiplexed signals are regulated by the light attenuator 33 so that the power of the overall wavelength multiplexed signals is set to a prescribed value, and sent to the transit network trunk composed of the optical fiber 32.

In contrast, when an optical waveguide device 10e corresponding to, for example, the wavelength λ1 is switched to a side different from the multiplexer, only the signal having the wavelength λ1 of the signals having been demultiplexed by the demultiplexer 27 is captured by an access network trunk composed of an optical fiber 30d. Further, when a signal having the wavelength λ1 is supplied from an access network trunk composed of an optical fiber 30b, a signal having the wavelength λ1 from the other trunk is supplied to the multiplexer 28 through an optical switch 10e, multiplexed with the wavelength multiplexed signals supplied from the optical fiber 31, and sent to the transit network trunk composed of the optical fiber 32.

Figure 24:
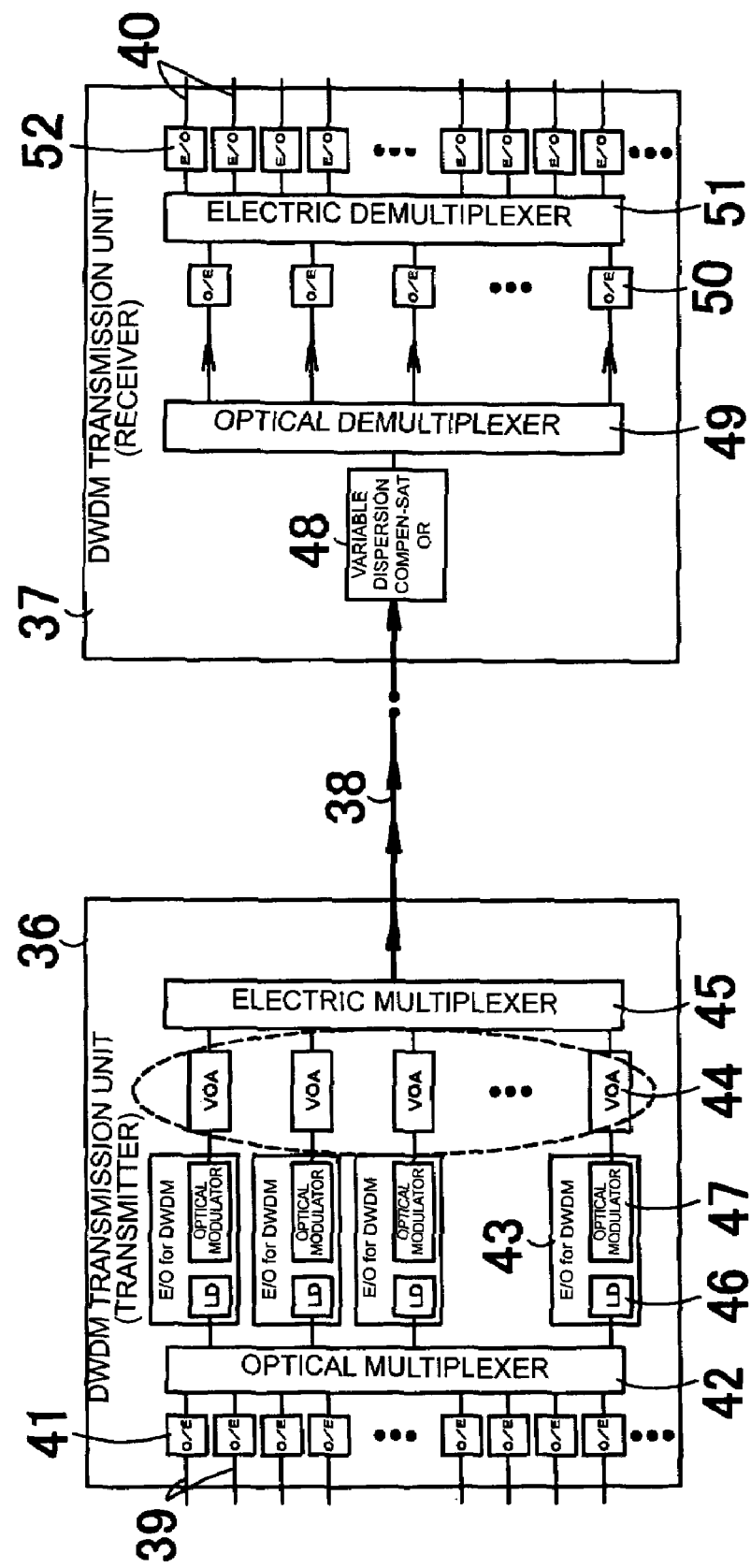
FIG. 24 shows a view explaining an optical communication system making use of the optical waveguide device of the present invention.

FIG. 24 shows a schematic view showing an optical multiplexing transmitter using the optical attenuator (for example, the optical waveguide device as shown in FIG. 5) according to the present invention. The optical multiplexing transmitter is composed of a transmission unit (DWDM transmission unit) 36 connected to a reception unit (DWDM transmission unit) 37 through an optical fiber 38. The optical multiplexing transmitter converts the optical signals, which have the respective wavelengths λ1, λ2 ... and are supplied from a plurality of optical fibers 39, into a wavelength multiplexed signal through the transmission unit 36. The optical mutiplexing transmitter also transmits to the reception unit 37 through the single optical fiber 38, restores to the original optical singles having the respective wavelengths λ1, λ2 ... in the reception unit 37, and distributes the signals having the respective wavelengths λ1, λ2 ... to respective optical fibers 40.

The transmission unit 36 is composed of an optic-electro transducers 41, an electric multiplexer (MUX) 42, DWDM electro-optic transducers 43, optical attenuators (VOAs) 44, and an optical multiplexer 45. Each optical attenuator 44 is composed of the optical waveguide device of the present invention. With this arrangement, the optical signals, which have the wavelengths λ1, λ2 . . . and are supplied from the plurality of optical fibers 39, are converted into electric signals having the respective wavelengths λ1, λ2 . . . by the optic-electro transducers 41. Thus the converted electric signals having the wavelengths λ1, λ2 . . . are multiplexed by the electric multiplexer 42 with respect to respective wavelength bands to which they belong so that the number of the signals is reduced. Next, the electric signals in the respective wavelength bands, which are output from the electric multiplexer 42, are converted into optical signals by the DWDM electro-optic transducers 43. Each DWDM electro-optic transducer 43 is composed of a semiconductor laser device 46 and an optical modulator 47. The semiconductor laser devices 46 are driven by electric signals output from electric multiplexer 42, and further optical signals modulated by the optical modulators 47 are output. After the powers of the respective optical signals output from the DWDM electro-optic transducers 43 are set to prescribed values by the optical attenuators 44, the optical signals are multiplexed to a single wavelength multiplexed signal which is supplied from the optical fiber 38. Note that the optical modulators 47 may be also composed of the optical waveguide devices of the present invention.

The reception unit is composed of a variable dispersion compensator 48, an optical demodulator 49, optic-electro transducers 50, an electric multiplexer 51, and electro-optic transducers 52. With this arrangement, the wavelength multiplexed signal sent from the optical fiber 38 is supplied to the optic-electro transducers 50 passing through the variable dispersion compensator 48 and demultiplexed to optical signals in the respective wavelength regions by the optic-electro transducers 50. The optical signals in the respective wavelength regions are converted into electric signals once by the optic-electro transducers 50, demultiplexed to the electric signals of having the respective wavelengths λ1, λ2 . . . by the electric multiplexer 51 and further restored to the original optical signals having the respective wavelengths λ1, λ2 . . . by the electro-optic transducers 52 and output from the respective optical fibers 40.

According to the method of manufacturing the optical waveguide device of the present invention, the optical waveguide, which is composed of the cores and the clad, is manufactured separately from the optical modulator, which is composed of the heaters and the electrodes that optically affect the light propagating in the cores, and thereafter optical waveguide is bonded to the optical modulator. Accordingly, a process, in which heat and a chemical agent that degrade the cores and the clad are used, is not employed. Further, the manufacturing method is not restricted by the heat and the chemical agent, the optical waveguide device having a pinpoint accuracy can be manufactured at low cost. According to the manufacturing method of the optical waveguide device of the present invention, there can be manufactured every optical waveguide device that includes elements for modulating light making use of a thermo-optical effect, electro-optical effect, magneto-optical effect, and the like.

In the optical waveguide device of the present invention, the wire bond pads connected to the external power supply is formed on the upper surface of the glass sheet and connected to the electrodes, the heaters, and the like formed on the lower surface of the glass sheet via the through-holes passing through the glass sheet. Since the electrodes and the heaters are formed on the surface different from the surface on which wiring for conducting the electrodes and the heaters is formed, even if the cores are disposed near to the electrodes and the heaters, the cores can be separated from the wiring and the wire bond pads through the thickness of the glass sheet. Accordingly, it is possible to prevent the heat generated by the wiring and the like and the change of the electric field and the magnetic field caused by the current flowing through the wiring from affecting the light propagating in the cores as far as possible.

Further, in the optical waveguide device of the present invention, there is not a possibility that the heaters are exfoliated while they are used because the heaters are sandwiched between the upper cladding layer and the glass sheet. Accordingly, the optical waveguide device can be used for a long period.

While the invention has been described with respect to a limited number of embodiments, those who skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical waveguide device comprising:
   an optical waveguide having a core configured to propagate light and a clad surrounding the core;
   an optical modulator joined to the optical waveguide, the optical modulator having at least one element affecting the light propagating in the core;
   a spacer disposed between the optical modulator and the optical waveguide, for maintaining a predetermined distance there between, the spacer comprises a first portion disposed on a first side of the core and a second portion disposed on a second side of the core; and
   a resin layer disposed between the optical waveguide and the optical modulator and between the first portion and second portion of the spacer;
   wherein the at least one element is a heater that changes the refractive index of the core making use of a thermo-optical effect.

2. The optical waveguide device according to claim 1, wherein the optical modulator comprises a substrate, a first conductive layer formed on the upper surface of the substrate and a second conductive layer formed on the lower surface of the substrate, the first conductive layer is brought into conduction with the second conductive layer, and the second conductive layer comprises the at least one element.

3. The optical waveguide device according to claim 2, wherein the substrate has a through-hole therethrough, and the first conductive layer and the second conductive layer are electrically interconnected via the through-hole.

4. The optical waveguide device according to claim 2, wherein the first conductive layer has electrode separation grooves.

5. The optical waveguide device according to claim 1, wherein a through-hole is provided proximate each portion of the spacer.

6. Optical communication device, comprising the optical waveguide device according to claim 1.

7. The optical waveguide device according to claim 1, wherein the resin layer is a clad layer.

8. The optical waveguide device according to claim 1, wherein the optical waveguide is made of resin.

\* \* \* \* \*